US012776813B2

(12) United States Patent
Yang et al.

(10) Patent No.: US 12,776,813 B2
(45) Date of Patent: Oct. 27, 2026

(54) MACHINE LEARNING FOR CSI FEEDBACK CONSIDERING POLARIZATIONS

(71) Applicant: Apple Inc., Cupertino, CA (US)

(72) Inventors: Weidong Yang, San Diego, CA (US); Wei Zeng, Saratoga, CA (US); Dawei Zhang, Saratoga, CA (US); Haitong Sun, Cupertino, CA (US); Oghenekome Oteri, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/101,942

(22) PCT Filed: Aug. 10, 2023

(86) PCT No.: PCT/US2023/029953

§ 371 (c)(1),
(2) Date: Feb. 7, 2025

(87) PCT Pub. No.: WO2024/035854

PCT Pub. Date: Feb. 15, 2024

(65) Prior Publication Data

US 2026/0045980 A1 Feb. 12, 2026

Related U.S. Application Data

(60) Provisional application No. 63/396,745, filed on Aug. 10, 2022.

(51) Int. Cl.
*H04B 7/0456* (2017.01)
*G06F 17/16* (2006.01)

(52) U.S. Cl.
CPC .......... *H04B 7/0456* (2013.01); *G06F 17/16* (2013.01)

(58) Field of Classification Search
CPC ............................ H04B 7/0456; G06F 17/16
See application file for complete search history.

(56) References Cited

U.S. PATENT DOCUMENTS 8,798,195 B2 * 8/2014 Tong .................. H04B 7/0641 455/39
12,068,816 B2 * 8/2024 Wernersson ......... H04B 7/0481
(Continued)

FOREIGN PATENT DOCUMENTS

EP 3826199 A1 5/2021
WO 2022/052030 A1 3/2022

OTHER PUBLICATIONS

International Search Report and Written Opinion dated Nov. 20, 2023 in connection with Application No. PCT/US2023/029953.
(Continued)

*Primary Examiner* — Jaison Joseph
(74) *Attorney, Agent, or Firm* — Eschweiler & Potashnik, LLC; Ningjiao Zhang

(57) ABSTRACT

The present disclosure relates to machine learning for CSI feedback considering polarizations. In an aspect, a wireless device, comprising: at least one antenna; at least one radio coupled to the at least one antenna; and a processor coupled to the at least one radio; wherein the processor is configured to generate at least one matrix related to CSI feedback, wherein each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of at least one antenna
(Continued)

of a cellular base station, and said plurality of vectors are associated with two different polarizations of the at least one antenna of the cellular base station, wherein each of the at least one matrix is arranged by arranging said plurality of vectors in the first dimension according to the polarizations such that vectors associated with a same polarization are arranged next to each other; obtain an output from processing the arranged at least one matrix using a neural network (NN); and transmit, via the at least one radio, information indicating the output to the cellular base station.

20 Claims, 16 Drawing Sheets

(56) References Cited

U.S. PATENT DOCUMENTS

| | | | | |
|---|---|---|---|---|
| 2017/0331535 | A1* | 11/2017 | Wei | H04B 7/0486 |
| 2021/0167835 | A1* | 6/2021 | Wang | H04B 7/0456 |
| 2021/0376887 | A1* | 12/2021 | Wu | H04B 7/0456 |
| 2022/0368379 | A1* | 11/2022 | Tsai | H04B 7/0417 |
| 2023/0042158 | A1* | 2/2023 | Zhang | H04B 7/046 |
| 2023/0058460 | A1* | 2/2023 | Huang | H04B 7/0639 |
| 2023/0291452 | A1* | 9/2023 | Chou | H04B 7/048 |
| 2023/0328568 | A1* | 10/2023 | Wu | H04W 24/10<br>370/252 |
| 2024/0063854 | A1* | 2/2024 | Athley | H04L 5/0023 |
| 2025/0008364 | A1* | 1/2025 | Park | G06N 3/045 |
| 2025/0132790 | A1* | 4/2025 | Fan | H04B 7/0417 |
| 2025/0226866 | A1* | 7/2025 | Sahin | H04B 7/0639 |
| 2025/0260450 | A1* | 8/2025 | Hindy | H04B 7/0639 |

OTHER PUBLICATIONS

Madadi Pranav et al; "PolarDenseNet: A Deep Learning Model or CCSI Feedback in Mimo Systems"; IIC2020—IEEE International Conference on Communications; May 16, 2022.

Mediatek Inc; "Evaluation on AI/ML for CSI feedback enhancement"; 3GPP Draft; R1-2205100; vol. RAN WG1; May 2, 2022.

International Preliminary Report an Patentability dated Feb. 4, 2025 in connection with Application No. PCT/US2023/029953.

* cited by examiner

MACHINE LEARNING FOR CSI FEEDBACK CONSIDERING POLARIZATIONS

REFERENCE TO RELATED APPLICATIONS

This Application is a National Phase entry application of International Patent Application No. PCT/US23/29953 filed Aug. 10, 2023, which claims the priority of U.S. Provisional Application No. 63/396,745, filed on Aug. 10, 2022, entitled "MACHINE LEARNING FOR CSI FEEDBACK CONSIDERING POLARIZATIONS" and is hereby incorporated by reference in its entirety.

TECHNICAL FIELD

This application relates generally to wireless communication systems, including machine learning for Channel State Information (CSI) feedback considering polarizations.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

SUMMARY

Embodiments relate to device, method, apparatus, computer-readable storage medium and computer program product for wireless communication.

According to an aspect, there is provided a wireless device, comprising: at least one antenna; at least one radio coupled to the at least one antenna; and a processor coupled to the at least one radio; wherein the processor is configured to generate at least one matrix related to channel state information (CSI) feedback, wherein each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of at least one antenna of a cellular base station, and said plurality of vectors are associated with two different polarizations of the at least one antenna of the cellular base station, wherein each of the at least one matrix is arranged by arranging said plurality of vectors in the first dimension according to the polarizations such that vectors associated with a same polarization are arranged next to each other; obtain an output from processing the arranged at least one matrix using a neural network (NN); and transmit, via the at least one radio, information indicating the output to the cellular base station.

According to another aspect, there is provided a cellular base station, comprising: at least one antenna; at least one radio coupled to the at least one antenna; and a processor coupled to the at least one radio; wherein the processor is configured to: receive, via the at least one radio, information indicating channel state information (CSI) feedback from a wireless device; input the information into a neural network; and obtain an output from the neural network, wherein the output is at least one matrix related to the CSI feedback, each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of the at least one antenna, and said plurality of vectors are associated with two different polarizations of the at least one antenna, and wherein each of the at least one matrix is arranged such that vectors in the first dimension associated with a same polarization are arranged next to each other.

According to another aspect, there is provided a method for a wireless device, comprising: generating at least one matrix related to channel state information (CSI) feedback, wherein each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of at least one antenna of a cellular base station, and said plurality of vectors are associated with two different polarizations of the at least one antenna of the cellular base station, wherein each of the at least one matrix is arranged by arranging said plurality of vectors in the first dimension according to the polarizations such that vectors associated with a same polarization are arranged next to each other; obtaining an output from processing the arranged at least one matrix using a neural network (NN); and transmitting, via the at least one radio, information indicating the output to the cellular base station.

According to another aspect, there is provided a method for a cellular base station, comprising receiving information indicating channel state information (CSI) feedback from a wireless device; inputting the information into a neural network; and obtaining an output from the neural network, wherein the output is at least one matrix related to the CSI feedback, each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of the at least one antenna, and said plurality of vectors are associated with two different polarizations of the at least one antenna, and wherein each of the at least one matrix is arranged such that vectors in the first dimension associated with a same polarization are arranged next to each other.

According to another aspect, there is provided an apparatus, comprising: a processor configured to cause a wireless device to: generate at least one matrix related to channel state information (CSI) feedback, wherein each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of at least one antenna of a cellular base station, and said plurality of vectors are associated with two different polarizations of the at least one antenna of the cellular base station, wherein each of the at least one matrix is arranged by arranging said plurality of vectors in the first dimension according to the polarizations such that vectors associated with a same polarization are arranged next to each other; obtain an output from processing the arranged at least one matrix using a neural network (NN); and transmit information indicating the output to the cellular base station.

According to another aspect, there is provided computer-readable storage medium storing program instructions, wherein the program instructions, when executed by a computer system, cause the computer system to perform the method of any of the above aspects.

According to another aspect, there is provided a computer program product, comprising program instructions which, when executed by a computer, cause the computer to perform the method of any of the above aspects.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
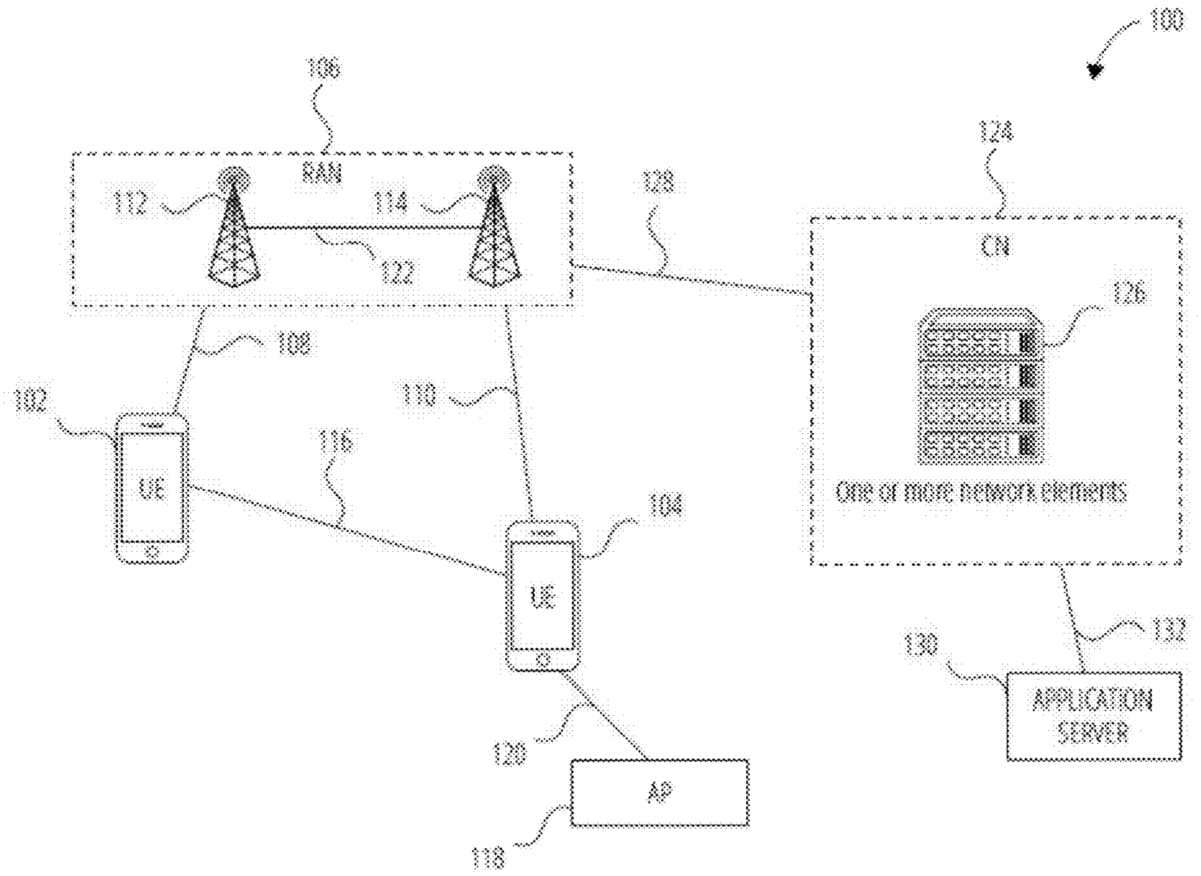
FIG. 1 illustrates an example architecture of a wireless communication system, according to embodiments disclosed herein.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, the wireless communication system 100 includes UE 102 and UE 104 (although any number of UEs may be used). In this example, the UE 102 and the UE 104 are illustrated as smartphones (e.g., handheld touchscreen mobile computing devices connectable to one or more cellular networks), but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112 and base station 114, that enable the connection 108 and connection 110.

In this example, the connection 108 and connection 110 are air interfaces to enable such communicative coupling, and may be consistent with RAT(s) used by the RAN 106, such as, for example, an LTE and/or NR.

In some embodiments, the UE 102 and UE 104 may also directly exchange communication data via a sidelink interface 116. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fi® router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 and/or the base station 114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 112 or base station 114 may be implemented as one or more software entities running on server computers as part of a virtual network. In addition, or in other embodiments, the base station 112 or base station 114 may be configured to communicate with one another via interface 122. In embodiments where the wireless communication system 100 is an LTE system (e.g., when the CN 124 is an EPC), the interface 122 may be an X2 interface. The X2 interface may be defined between two or more base stations (e.g., two or more eNBs and the like) that connect to an EPC, and/or between two eNBs connecting to the EPC. In embodiments where the wireless communication system 100 is an NR system (e.g., when CN 124 is a 5GC), the interface 122 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 124).

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface 128. In embodiments, the S1 interface 128 may be split into two parts, an S1 user plane (S1-U) interface, which carries traffic data between the base station 112 or base station 114 and a serving gateway (S-GW), and the S1-MME interface, which is a signaling interface between the base station 112 or base station 114 and mobility management entities (MMEs).

In embodiments, the CN 124 may be a 5GC, and the RAN 106 may be connected with the CN 124 via an NG interface 128. In embodiments, the NG interface 128 may be split into two parts, an NG user plane (NG-U) interface, which carries traffic data between the base station 112 or base station 114 and a user plane function (UPF), and the S1 control plane (NG-C) interface, which is a signaling interface between the base station 112 or base station 114 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

Figure 2:
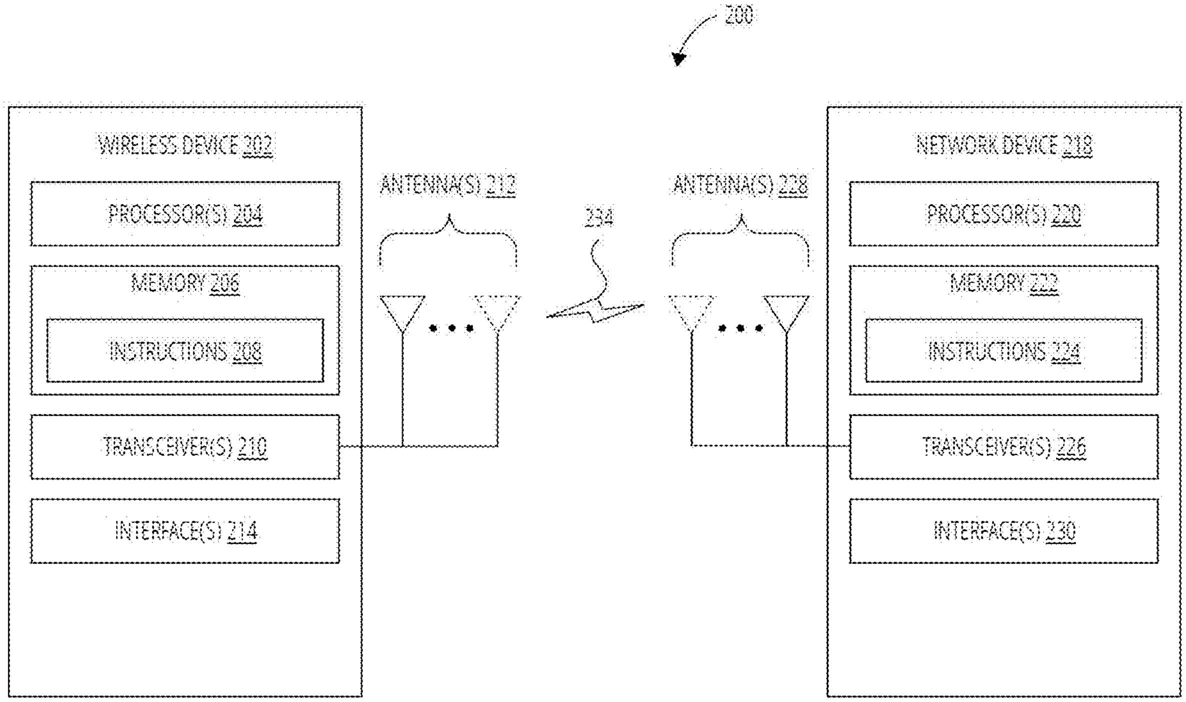
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a UE of a wireless communication system. The network device 218 may be, for example, a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 210/antenna(s) 212 already described) that allow for communication between the UE and other devices and may operate according to known protocols (e.g., Wi-Fi®, Bluetooth®, and the like).

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230. The interface(s) 230 may be used to provide input to or output from the network device 218. For example, a network device 218 that is a base station may include interface(s) 230 made up of transmitters, receivers, and other circuitry (e.g., other than the transceiver(s) 226/antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

The following description will take 5G NR as an example to illustrate the concept of the present disclosure, but it should be understood that the solution of the present disclosure is applicable to any appropriate mobile communication technology (e.g. 6G or any applicable advanced mobile communication technology).

In the following description, gNB is sometimes used to represent the control device at the base station side in a wireless communication network. It should be understood this is for illustrative purpose only but not restrictive. A base station based on any appropriate mobile communication technology is applicable.

With the development of mobile communication technology and diversity of application scenarios, the requirements for the CSI (especially downlink CSI) feedback are getting higher and higher. For example, with large scale MIMO (i.e. multiple input multiple output) being put into use, as the number of antennas increases, the amount of feedback information to be transmitted from a UE to a base station increases sharply and in the case of using traditional CSI feedback technology, the computing complexity at the UE side and at the network side is also significantly increased. For another example, as mobile communication technology is applied to scenarios involving rapid channel state changes such as high speed mobile communication scenario, in the case of using traditional CSI feedback technology, the UE needs to provide CSI feedback more frequently, which leads to greater consumption of communication resources.

Figure 3:
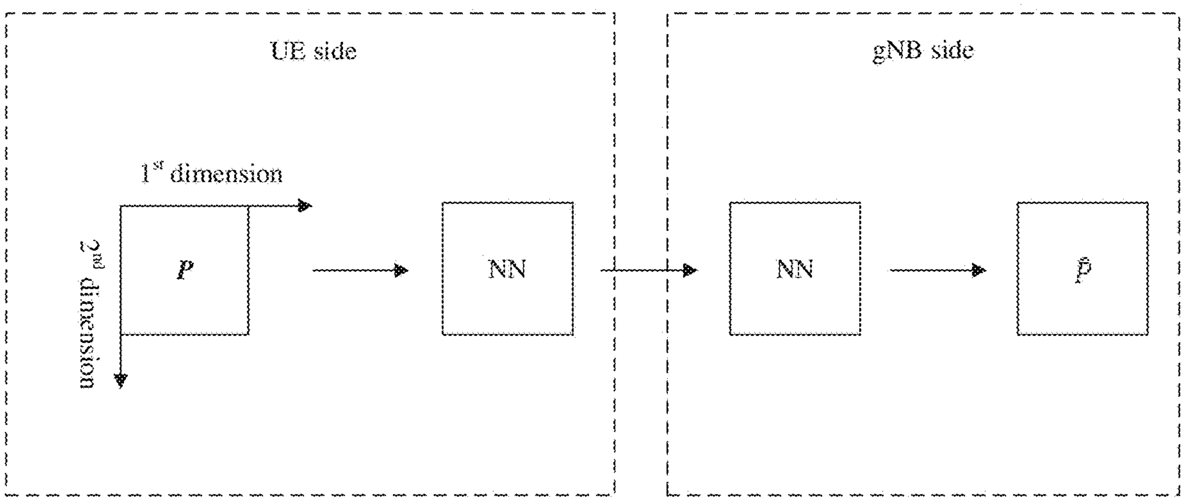
FIG. 3 illustrates an example system according to embodiments disclosed herein.

In view of this, there is a need to provide some new concept for CSI feedback. The present disclosure provides a solution where CSI feedback is provided using a neural network (NN). FIG. 3 illustrates an example system according to embodiments disclosed herein.

As shown in FIG. 3, according to the present disclosure, a UE can input CSI feedback information into an NN for processing. The NN at the UE side can for example compress the input CSI feedback information and/or predict future CSI feedback information (e.g. such feedback can be available for the gNB to determine which precoding matrix(es) to be used for a certain time period in the future) based on the input CSI feedback information, e.g. using suitable machine learning technology. Upon obtaining the output (e.g. compressed information and/or predicted information corresponding to the input CSI feedback information) from the NN, the UE can transmit information indicating the output to the gNB. The information can be in any suitable form such as a bit sequence, a matrix, etc. Upon receiving such information, the gNB can input the information into another NN for processing. The NN at the gNB side can restore the initial CSI feedback information (e.g. with or without loss) based on any suitable machine learning technology.

The NN at the UE side and the NN at the gNB side can be any applicable neural network, such as Convolutional Neural Networks (CNN), transformer, Generative Adversarial Network (GAN), etc. The NN at the UE side and the NN at the gNB side can be trained separately in advance.

According to the present disclosure, the CSI feedback information to be processed by the NN at the UE side can be at least one matrix related to CSI feedback, and each of the at least one matrix (e.g. matrix P shown in FIG. 3) may correspond to one spatial layer at the UE side. The NN can separately process each matrix corresponding to a respective spatial layer at the UE side. In some aspects, such a matrix can be any of the following:

- a channel matrix for at least one sub-band;
- a precoding matrix for at least one sub-band W, which may be given by size Number of sub-bands×Number of ports, and each sub-band vector of the downlink precoding matrix W may be an Eigen vector of the channel matrix for the sub-band;
- a precoding matrix associated with at least one indicated spatial beam for at least one sub-band $$\tilde{W}_2 W_f^H,$$

which may be given by size Number of sub-bands× Number of spatial beams; or
- a precoding matrix associated with at least one indicated spatial beam and at least one indicated delay $W_2$, which may be given by size Number of delay taps×Number of spatial beams.

The UE can determine the at least one matrix related to CSI feedback based on signals received from the gNB, e.g. using any known method including the method defined in 3GPP standard for determination of the channel matrix, the precoding matrix W, the precoding matrix $$\tilde{W}_2 W_f^H,$$

and/or the precoding matrix $W_2$. Any of the at least one matrix related to CSI feedback may possess the following characteristics: for such a matrix (e.g. matrix P shown in FIG. 3), the matrix comprises a plurality of vectors in a first dimension, a number of the plurality of vectors is the same as a size of a second dimension of the matrix, a number of elements in each of the plurality of vectors is the same as a size of the first dimension of the matrix, and the plurality of vectors belong to at least two groups, each group of vectors are associated with a same polarization of at least one antenna (or antenna port) of a gNB, and the plurality of vectors are associated with two different polarizations of the at least one antenna of the gNB. Although four particular types of matrices are listed herein as the matrix related to CSI feedback, the present disclosure is not limited to such matrices and any suitable matrix can be used as the input of the NN as long as the matrix comply with the above described characteristics.

Figure 4:
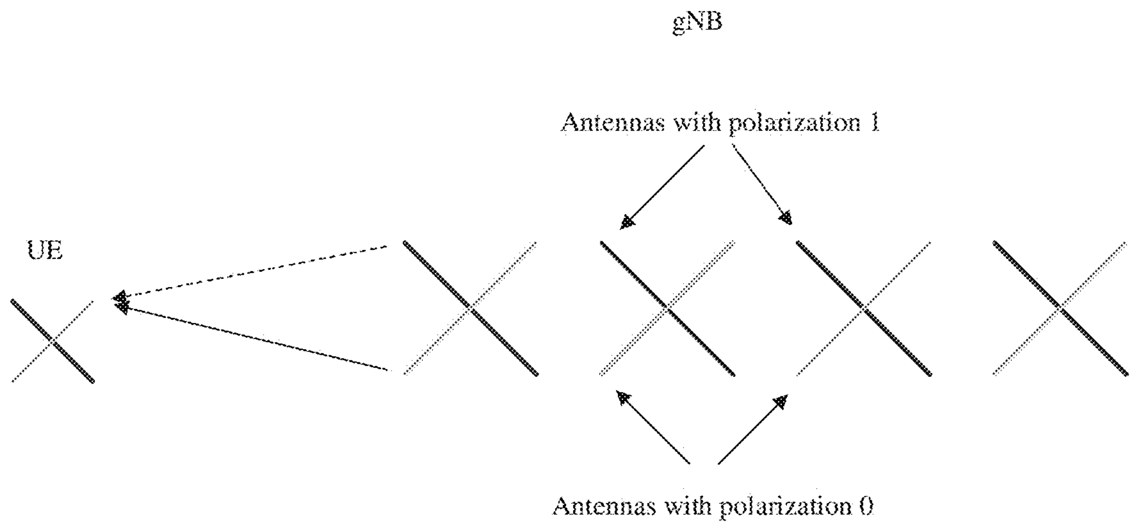
FIG. 4 illustrates signal reception at the UE side from an antenna array of a gNB.

Typically, antennas are placed on a gNB as an antenna array. FIG. 4 illustrates signal reception at the UE side from an antenna array of a gNB assuming the gNB has 8 antenna ports with two polarizations for transmission (e.g. 45 degrees for polarization 0 and −45 degrees for polarization 1). Under this assumption, when the UE receives the signal transmitted via the antenna ports with polarization at 45 degrees (i.e. polarization 0) using the reception antenna with polarization at 45 degrees (i.e. polarization 0), the reception strength would be relatively strong; and when the UE receives the signal transmitted via the ports with polarization at −45 degrees (i.e. polarization 1) using the reception antenna with polarization at 45 degrees (i.e. polarization 0), the reception strength would relatively weak.

Particularly, assuming an ideal line of sight condition with depolarization ratio at 0, and assuming the gNB uses 8 antenna ports for transmission and there are 8 sub-bands, the channel matrix comprising elements indicating amplitude of the received signals can be:

$$\begin{bmatrix} 1&1&1&1&1&1&1&1\\ 0&0&0&0&0&0&0&0\\ 1&1&1&1&1&1&1&1\\ 0&0&0&0&0&0&0&0\\ 1&1&1&1&1&1&1&1\\ 0&0&0&0&0&0&0&0\\ 1&1&1&1&1&1&1&1\\ 0&0&0&0&0&0&0&0 \end{bmatrix}$$

wherein, each vector in the horizonal dimension, e.g. [1 1 1 1 1 1 1 1] indicates the signals received on 8 sub-bands associated with one polarization of the antennas of the gNB (e.g. corresponding to the signals transmitted via a same antenna port), and each vector in the vertical dimension, i.e. [1 0 1 0 1 0 1 0] indicates the signals received in on sub-band associated with different polarizations of the antennas of the gNB (e.g. corresponding to the signals transmitted via 8 different antenna ports).

Figure 5:
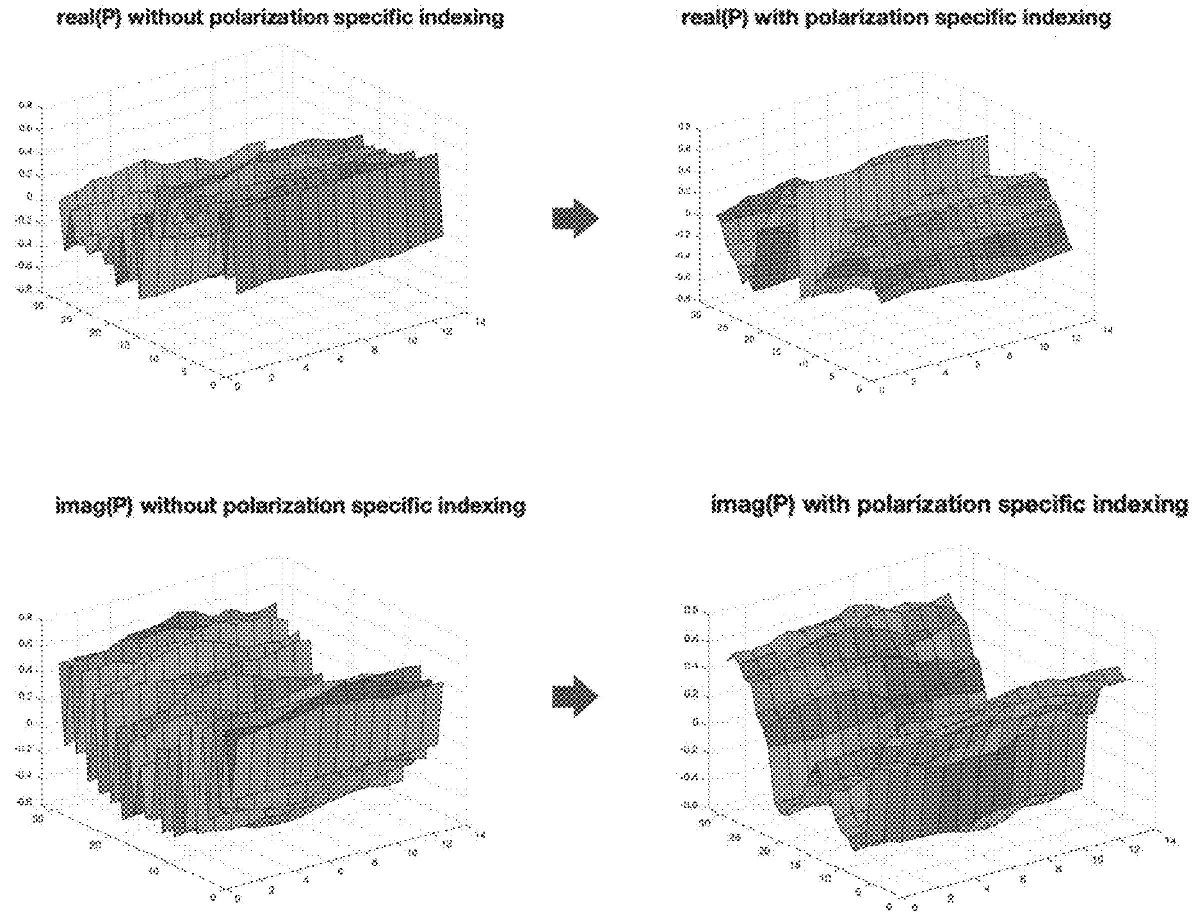
FIG. 5 illustrates the differences in fluctuation of values of elements in the matrix related to CSI feedback to be processed by a neural network without polarization specific indexing and with polarization specific indexing.

It can be seen from such a matrix, there is a significant fluctuation in values of the elements (e.g. fluctuation in amplitude of the received signals). In actual cases, due to various factors, for the channels on which the transmission antenna of the gNB and the reception antenna of the UE share a same polarization, the received signal strength on these channels may not be completely consistent, but in general the received signal strength on these channels are relatively strong. While, for the channels on which the polarization of the transmission antenna of the gNB and the polarization of the reception antenna of the UE are orthogonal, weak signals with different degrees of strength may still be received on these channels. Therefore, in general, a significant fluctuation in amplitude of the received signals may exist in the actual channel matrix (and any applicable matrix related to CSI feedback). FIG. 5 shows such a fluctuation.

As known in the art, the matrix for CSI feedback may contain a plurality of elements with complex values. FIG. 5 illustrates the matrix real(P) containing elements each corresponding to the real part of each element of the precoding matrix P as well as the matrix imag(P) containing elements each corresponding to the imaginary part of each element of the precoding matrix P, under the case of 32 antenna ports and 13 sub-bands.

As can be seem from the left part of FIG. 5, a significant fluctuation exists in both the original real(P) and the original imag(P), and such a fluctuation may also exist in the original precoding matrix P containing complex values.

However, such a fluctuation is unfavorable for the NN the process the matrix related to CSI feedback. For example, such a fluctuation may reduce the performance and/or efficiency of the NN. For example, such a fluctuation may inhibit the compression level on the matrix. For another example, such a fluctuation may cause the NN being difficult to predict CSI feedback information for a long future time period. For another example, such a fluctuation may lead to an increase in processing time of the NN. Therefore, there is a need to provide a solution to avoid such degradation in performance and efficiency of the NN.

According to the present disclosure, the UE can perform some preprocessing on the matrix related to CSI feedback before inputting such a matrix into the NN for processing. Particularly, according to the present disclosure, for each matrix related to CSI feedback as described above, i.e. the matrix comprising a plurality of vectors in a first dimension, a number of the plurality of vectors being the same as a size of a second dimension of the matrix, a number of elements in each of the plurality of vectors being the same as a size of the first dimension of the matrix, and the plurality of vectors belonging to at least two groups, each group of vectors being associated with a same polarization of at least one antenna of a gNB, and the plurality of vectors being associated with two different polarizations of the at least one antenna of the gNB, the UE may arrange the matrix by arranging vectors in the first dimension according to the polarizations such that vectors in the first dimension associated with a same polarization are arranged next to each other. For example, the UE may arrange the matrix such that all vectors in the first dimension in a group associated with a same polarization are arranged next to each other and different groups of vectors are arranged next to each other.

Take the above example again, assuming an ideal line of sight condition with depolarization ratio at 0, and assuming the gNB uses 8 antenna ports for transmission and there are 8 sub-bands, the channel matrix after the arrangement according to the principle of the present disclosure can be:

$$\begin{bmatrix} 1&1&1&1&1&1&1&1\\ 1&1&1&1&1&1&1&1\\ 1&1&1&1&1&1&1&1\\ 1&1&1&1&1&1&1&1\\ 0&0&0&0&0&0&0&0\\ 0&0&0&0&0&0&0&0\\ 0&0&0&0&0&0&0&0\\ 0&0&0&0&0&0&0&0 \end{bmatrix}$$

As can be seen from the arranged matrix, with such polarization specific indexing, the fluctuation in the matrix related to CSI feedback can be smoothed.

FIG. 5 illustrates the differences in fluctuation of values of elements in the precoding matrix without polarization specific indexing and with polarization specific indexing. As can be seem from the right part of FIG. 5, in both the original real(P) and the original imag(P), the fluctuation is smoothed, and such an effect also applies to the precoding matrix P containing complex values.

According to the present disclosure, there are several modes of implementation for realizing such polarization specific indexing which will be described in detail hereinafter.

Figure 6:
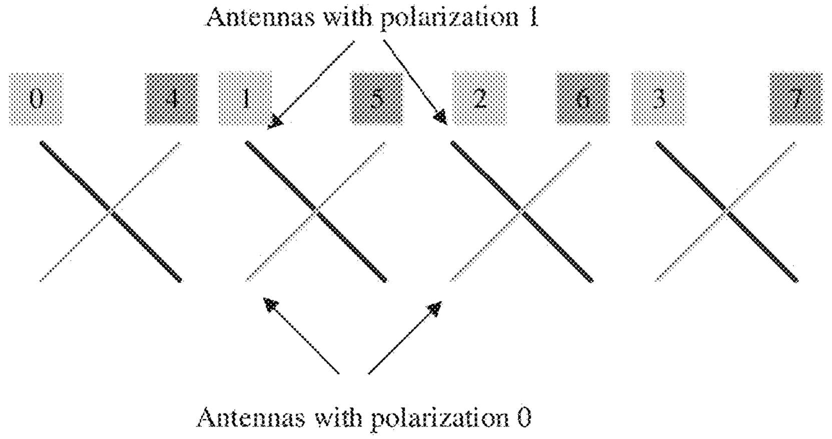
FIG. 6 illustrates an example approach for arranging the matrix related to CSI feedback to be processed by a neural network according to a first embodiment of the present disclosure.

FIG. 6 illustrates an example approach for arranging the matrix related to CSI feedback to be processed by the NN according to a first embodiment of the present disclosure. According to the first embodiment of the present disclosure, the matrix related to CSI feedback corresponding to one spatial layer at the UE side can be input into the NN for processing as a whole with the elements being arranged according to polarizations of the transmission antenna(s) of the gNB. For example, the UE can firstly iterate the antenna ports at one polarization and then iterate the antenna ports at another polarization so as to generate the matrix related to CSI feedback arranged according to polarizations.

FIG. 6 shows the case that the gNB uses 8 antenna ports 0-7 with two polarizations (polarization 0 and polarization 1) for transmission. Under such a case, the antenna ports with polarization 1 are iterated over firstly and then the antenna ports with polarization 0 are iterated over. After the iteration, the obtained entire matrix can be input into the NN for processing.

Please note that directly generating the particularly arranged matrix by iterating the antenna ports according to polarizations is merely an example of implementation without limitation. The UE can use any suitable approach to generate the matrix as long as the elements in the matrix are arranged according to the polarizations according to the principle of the present disclosure. For example, the UE can firstly determine an initial matrix related to CSI-RS and then arrange the initial matrix to put the vectors in the first dimension associated with a same polarization next to each other.

According to a first mode of implementation of the first embodiment, the NN can be a real-value neural network which may not have the ability to handle complex values. In view of this, according to the first mode of implementation of the first embodiment, the UE can arrange the matrix related to CSI feedback by splitting the matrix into a first submatrix containing elements each corresponding to a real part value of each element of the matrix, and a second submatrix containing elements each corresponding to an imaginary part value of each element of the matrix. The first submatrix and the second submatrix can both be arranged according to the polarizations of the antenna(s) of the gNB such that vectors in the first dimension in the first submatrix associated with a same polarization are arranged next to each other and vectors in the first dimension in the second submatrix associated with a same polarization are arranged next to each other. The UE can provide the first submatrix and the second submatrix as two input channels to the NN. Note that, "splitting" the matrix into a first submatrix and a second submatrix does not necessarily means there must be two steps (i.e. firstly generating the matrix related to CSI feedback with complex value and then splitting the complex matrix into two submatrices) for obtaining the first submatrix containing the real part values and the second submatrix containing the imaginary part values, but the UE can implicitly split the matrix by directly generating two submatrices corresponding to the real part values and the imaginary part values respectively.

Figure 7:
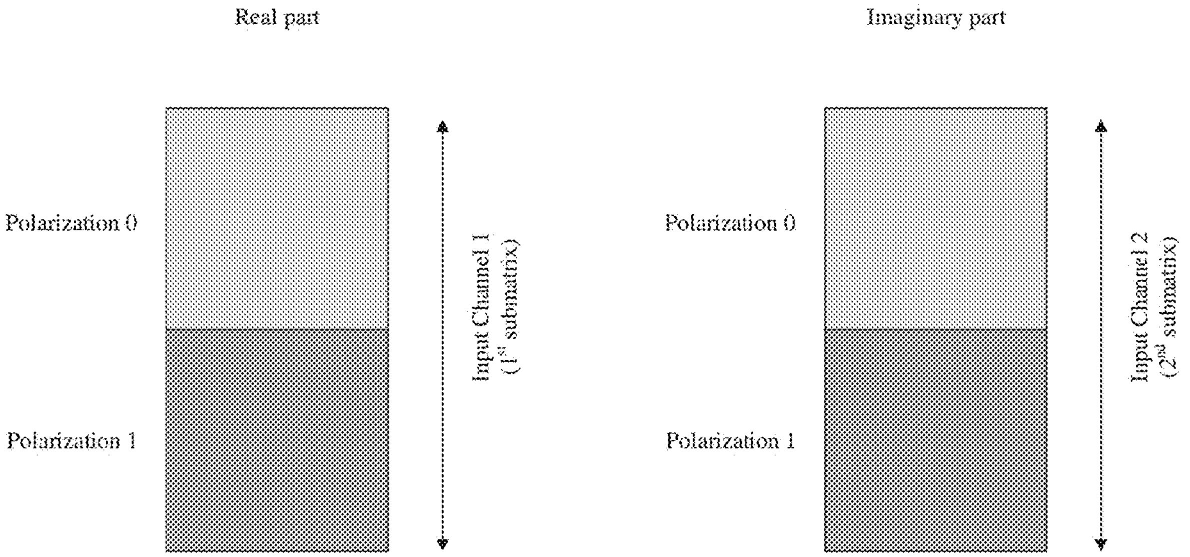
FIG. 7 illustrates an example arrangement for the matrix related to CSI feedback to be processed by a neural network according to a first implementation of a first embodiment of the present disclosure.

FIG. 7 illustrates an example arrangement for the matrix related to CSI feedback to be processed by the NN according to the first mode of implementation of the first embodiment.

As shown in FIG. 7, for one spatial layer at the UE side, the UE can generate two separate submatrices (the $1^{st}$ submatrix for the real part and the $2^{nd}$ submatrix for the imaginary part) as two separate input channels (Input Channel 1 and Input Channel 2) for the NN. For each submatrix, the submatrix comprises a plurality of vectors in a first dimension (e.g. a plurality of horizonal vectors), a number of the plurality of vectors is the same as a size of a second dimension (e.g. vertical dimension) of the matrix, a number of elements in each of the plurality of vectors is the same as a size of the first dimension of the matrix, and the plurality of vectors belong to at least two groups, each group of vectors are associated with a same polarization of at least one antenna of a cellular base station, and the plurality of vectors are associated with two different polarizations of the transition antenna(s) of the gNB. Each submatrix is arranged such that vectors in the first dimension (i.e. the horizonal vectors) associated with a same polarization are arranged next to each other. In other words, as shown in FIG. 7, for each submatrix, all the horizonal vectors associated with polarization 0 are arranged in the upper portion of the submatrix, and all horizonal vectors associated with polarization 1 are arranged in the lower portion of the submatrix.

The arrangement for the matrix related to CSI feedback corresponding to one spatial layer at the UE side has been detailly explained above. When the UE supports multiple spatial layers, further characteristic of the matrices corresponding to the multiple spatial layers can be observed.

Assuming the gNB has 8 antenna ports with two polarizations for transmission (e.g. 45 degrees for polarization 0 and −45 degrees for polarization 1) and the UE has two antennas for reception (i.e. two spatial layers), one with polarization at 45 degrees (e.g. spatial layer 1) and the other with polarization at −45 degrees (e.g. spatial layer 2), further assuming an ideal line of sight condition with depolarization ratio at 0, and assuming the gNB uses 8 antenna ports for transmission and there are 8 sub-bands, then the channel matrix corresponding to spatial layer 1 comprising elements indicating amplitude of the received signals can be:

$$\begin{bmatrix} 1&1&1&1&1&1&1&1\\ 0&0&0&0&0&0&0&0\\ 1&1&1&1&1&1&1&1\\ 0&0&0&0&0&0&0&0\\ 1&1&1&1&1&1&1&1\\ 0&0&0&0&0&0&0&0\\ 1&1&1&1&1&1&1&1\\ 0&0&0&0&0&0&0&0 \end{bmatrix}$$

and, the channel matrix corresponding to spatial layer 2 comprising elements indicating amplitude of the received signals can be:

$$\begin{bmatrix} 0&0&0&0&0&0&0&0\\ 1&1&1&1&1&1&1&1\\ 0&0&0&0&0&0&0&0\\ 1&1&1&1&1&1&1&1\\ 0&0&0&0&0&0&0&0\\ 1&1&1&1&1&1&1&1\\ 0&0&0&0&0&0&0&0\\ 1&1&1&1&1&1&1&1 \end{bmatrix}$$

If the matrix associated with each respective polarization is arranged according to the polarizations, the arranged matrix corresponding to spatial layer 1 can be:

$$\begin{bmatrix} 1&1&1&1&1&1&1&1\\ 1&1&1&1&1&1&1&1\\ 1&1&1&1&1&1&1&1\\ 1&1&1&1&1&1&1&1\\ 0&0&0&0&0&0&0&0\\ 0&0&0&0&0&0&0&0\\ 0&0&0&0&0&0&0&0\\ 0&0&0&0&0&0&0&0 \end{bmatrix}$$

and, the arranged matrix corresponding to spatial layer 2 can be:

$$\begin{bmatrix} 0&0&0&0&0&0&0&0\\ 0&0&0&0&0&0&0&0\\ 0&0&0&0&0&0&0&0\\ 0&0&0&0&0&0&0&0\\ 1&1&1&1&1&1&1&1\\ 1&1&1&1&1&1&1&1\\ 1&1&1&1&1&1&1&1\\ 1&1&1&1&1&1&1&1 \end{bmatrix}$$

Based on the arranged matrices, it can be seen that for the matrix corresponding to spatial layer 1, the elements corresponding to the signals with strong reception strength are located at the upper portion of the matrix, while for the matrix corresponding to spatial layer 2, the elements corresponding to the signals with strong reception strength are located at the lower portion of the matrix. That is to say, for the matrix corresponding to spatial layer 1, the signal trend which is caused by the polarizations of the transmission antennas of the gNB and is represented by the elements in the matrix from the upper portion to the lower portion is from strong to weak. While, for the matrix corresponding to spatial layer 2, the signal trend which is caused by the polarizations of the transmission antennas of the gNB and is represented by the elements in the matrix from the upper portion to the lower portion is from weak to strong. Therefore, the signal trend represented by the elements is flipped between the matrix corresponding to spatial layer 1 and the matrix corresponding to spatial layer 2.

However, if a same neural network is used for processing both matrices corresponding to both spatial layers separately, the neural network needs to handle different signal trends represented by the matrices, i.e. from strong to weak and from weak to strong, which may be unfavorable for the performance and/or efficiency of the NN. In view of this, the present disclosure provides a variation to the first mode of implementation of the first embodiments.

According to such a variation, for more than one spatial layer at the UE side, the UE may generate more than one matrix related to CSI feedback, each matrix may correspond to one spatial layer at the UE side, and the UE may arrange the more than one matrix such that among the first submatrices (i.e. corresponding to the real part) of the more than one matrix corresponding to the more than one spatial layer, the arrangements of the groups of vectors in the first dimension associated with two different polarizations in the first submatrices of said more than one matrix are aligned such that signal trends depending on said two different polarizations represented by elements in the first submatrices of said more than one matrix are aligned, and among the second submatrices (i.e. corresponding to the real part) of said more than one matrix corresponding to said more than one spatial layer, the arrangements of the groups of vectors in the first dimension associated with said two different polarizations in the second submatrices of said more than one matrix are aligned such that signal trends depending on said two different polarizations represented by elements in the second submatrices of said more than one matrix are aligned.

Figure 8:
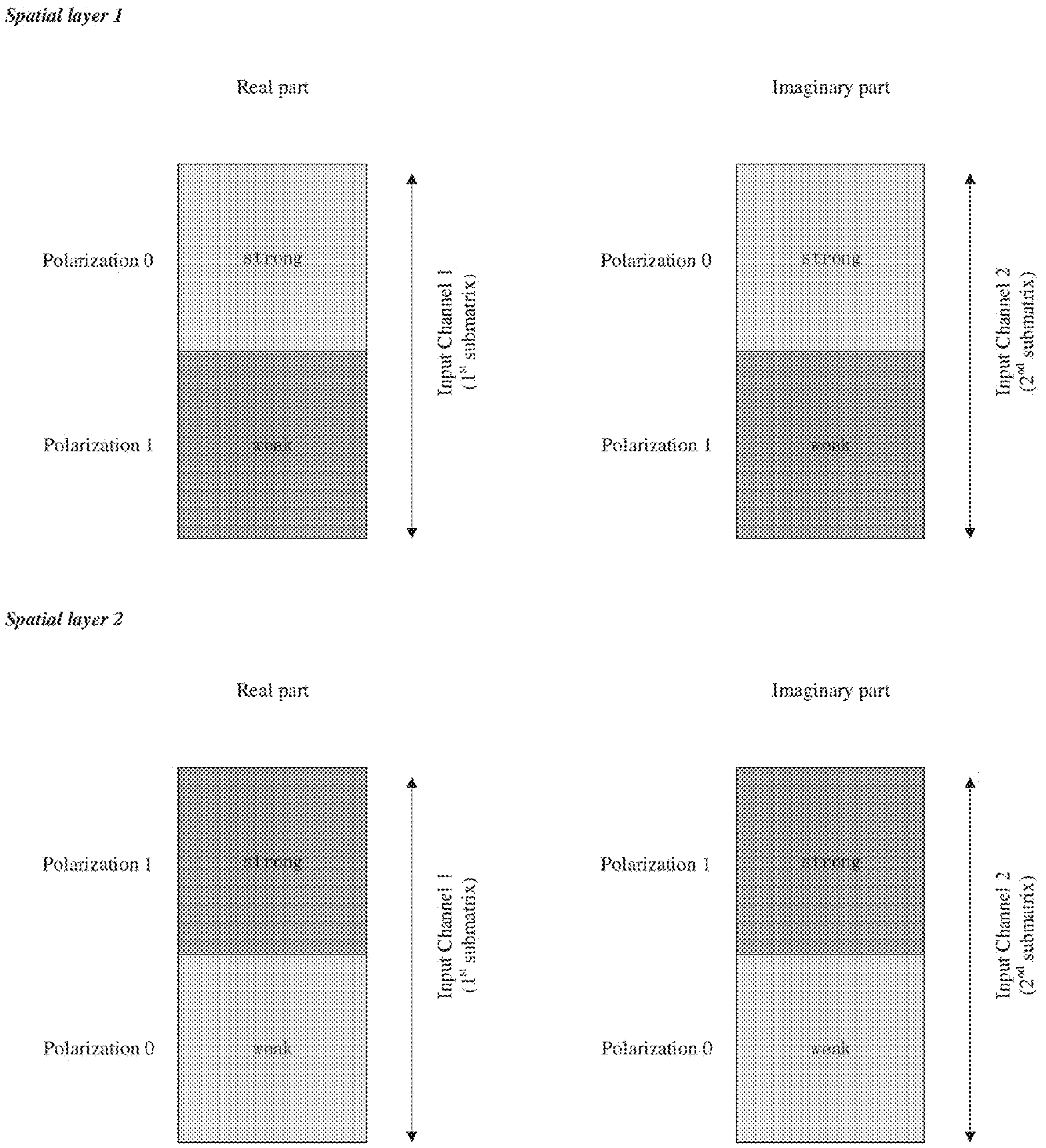
FIG. 8 illustrates an example arrangement for the matrix related to CSI feedback to be processed by a neural network according to a variation of a first implementation of a first embodiment of the present disclosure.

FIG. 8 illustrates an example arrangement for the matrix related to CSI feedback to be processed by the NN according to the above-described variation of the first implementation of the first embodiment of the present disclosure.

FIG. 8 illustrates the case where there are two spatial layers at UE side. As shown in FIG. 8, for Spatial layer 1, the $1^{st}$ submatrix and $2^{nd}$ submatrix are arranged such that the vectors in the horizontal dimension associated with Polarization 0 are arranged in the upper portion of the submatrix and the vectors in the horizontal dimension associated with Polarization 1 are arranged in the lower portion of the submatrix, such that the signal trend represented by the elements in the $1^{st}$ submatrix and/or $2^{nd}$ submatrix corresponding to Spatial layer 1 is from strong to weak. While, for Spatial layer 2, the $1^{st}$ submatrix and $2^{nd}$ submatrix are arranged such that the vectors in the horizontal dimension associated with Polarization 1 are arranged in the upper portion of the submatrix and the vectors in the horizontal dimension associated with Polarization 0 are arranged in the lower portion of the submatrix, such that the signal trend represented by the $1^{st}$ submatrix and/or $2^{nd}$ submatrix is also from strong to weak, which is aligned with the signal trend represented by the elements in the $1^{st}$ submatrix and/or $2^{nd}$ submatrix corresponding to Spatial layer 1.

Note that the arrangement shown in FIG. 8 is just exemplary without limitation and the number of spatial layers at the UE side is not limited to 2. The UE can arrange the submatrices for different spatial layers (e.g. more than 2) as long as the signal trends represented by the submatrices corresponding to the different spatial layers are aligned (e.g. either from strong to weak or from weak to strong).

With the matrices being arranged in an aligned way among multiple spatial layers at the UE side, the NN is able to handle matrices corresponding to different spatial layers with an aligned signal trend represented by the elements in the matrices. Therefore, the output of the NN may be favorable, e.g. with higher degree of compression and/or available for a longer future time period.

According to a second mode of implementation of the first embodiment, the NN can be a complex-value neural network which may have the ability to handle both real values and complex values. In view of this, according to the second mode of implementation of the first embodiment, different from the first mode of implementation, the UE does not need to split the complex matrix related to CSI feedback into two submatrices each corresponding to the real part and the imaginary part. Instead, the UE can directly input the complex matrix as a signal input channel into the NN for processing.

Figure 9:
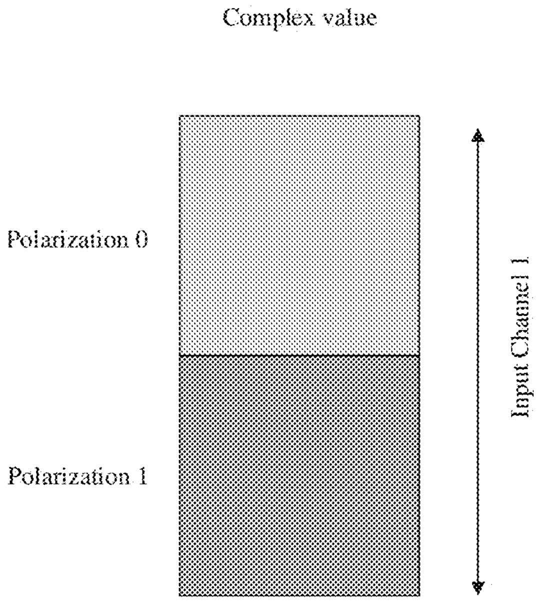
FIG. 9 illustrates an example arrangement for the matrix related to CSI feedback to be processed by a neural network according to a second implementation of a first embodiment of the present disclosure.

FIG. 9 illustrates an example arrangement for the matrix related to CSI feedback to be processed by the NN according to the second mode of implementation of the first embodiment.

As shown in FIG. 9, for one spatial layer at the UE side, the matrix to be processed by the NN may comprise a plurality of vectors in the horizonal dimension (e.g. a first dimension). The number of the plurality of vectors is the same as a size of the vertical dimension (e.g. a second dimension) of the matrix. The number of elements in each of the plurality of vectors is the same as a size of the first dimension of the matrix, and the plurality of vectors belong to two groups, each group of vectors being associated with a same polarization of the transmission antenna(s) of the gNB. All vectors are associated with two different polarizations of the transmission antenna(s) of the gNB. Particularly, for each matrix corresponding to on spatial layer at the UE side, the matrix is arranged by arranging the vectors in the first dimension according to the polarizations such that vectors associated with a same polarization are arranged next to each other. As shown in FIG. 9, all the horizonal vectors associated with polarization 0 are arranged in the upper portion of the submatrix, and all horizonal vectors associated with polarization 1 are arranged in the lower portion of the submatrix.

As described above, when the UE supports multiple spatial layers, among different matrices corresponding to the multiple spatial layers, the signal trends represented by elements in different matrices from the upper portion to the lower portion may be different (e.g. flipped). Therefore, similarly to the variation for the first mode of implementation of the first embodiment, according to a variation for the second mode of implementation of the second embodiment, for more than one spatial layer at the UE side, the UE may generate more than one matrix related to CSI feedback, each matrix may correspond to one spatial layer at the UE side. The UE may arrange the more than one matrix in the following way that among the more than one matrix corresponding to the more than one spatial layer, the arrangements of the groups of vectors associated with the two different polarizations of the transmission antenna(s) of the gNB in the more than one matrix are aligned such that signal trends depending on two different polarizations of the transmission antenna(s) of the gNB represented by elements in the more than matrix corresponding the more than one spatial layer are aligned.

Figure 10:
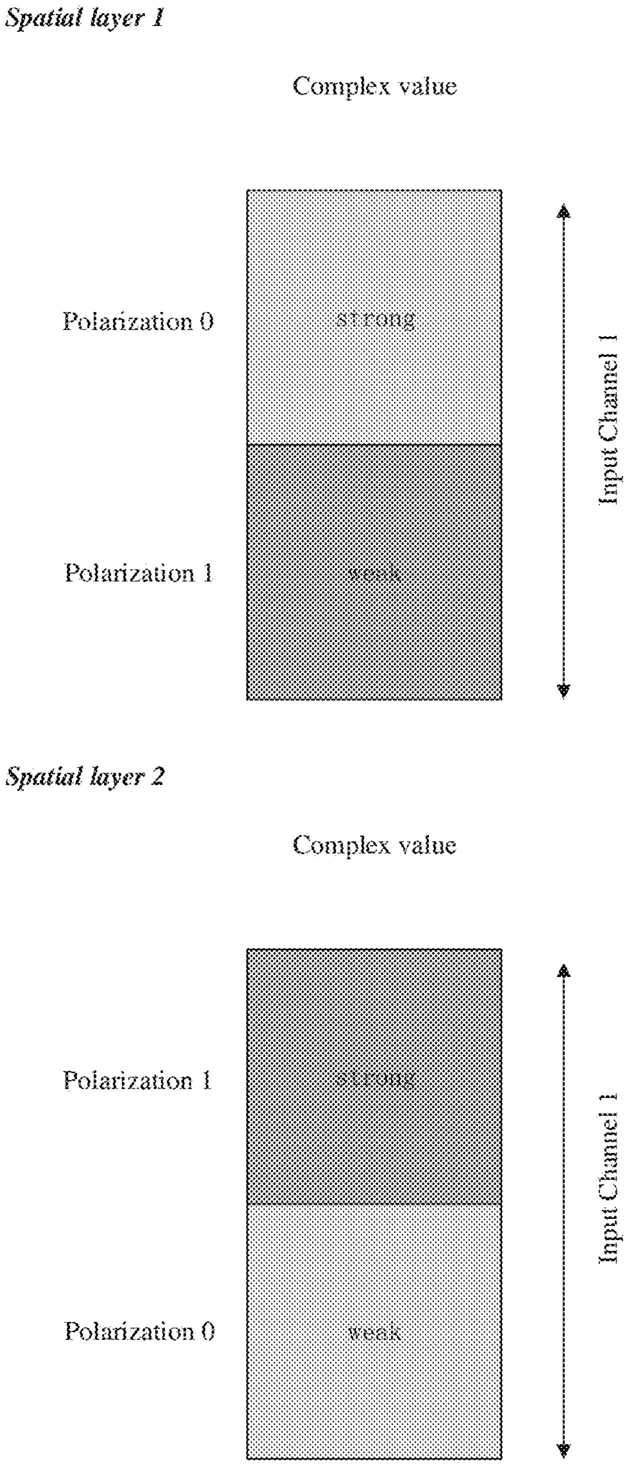
FIG. 10 illustrates an example arrangement for the matrix related to CSI feedback to be processed by a neural network according to a variation of a second implementation of a first embodiment of the present disclosure.

FIG. 10 illustrates an example arrangement for the matrix related to CSI feedback to be processed by the NN according to the above-described variation of the second implementation of the first embodiment of the present disclosure.

FIG. 10 illustrates the case where there are two spatial layers at UE side. As shown in FIG. 10, for Spatial Layer 1, the complex matrix is arranged such that the vectors in the horizontal dimension associated with Polarization 0 are arranged in the upper portion of the matrix and the vectors in the horizontal dimension associated with Polarization 1 are arranged in the lower portion of the submatrix, such that the signal trend represented by the elements of the matrix corresponding to Spatial layer 1 is from strong to weak. While, for Spatial layer 2, the matrix is arranged such that the vectors in the horizontal dimension associated with Polarization 1 are arranged in the upper portion of the matrix and the vectors in the horizontal dimension associated with Polarization 0 are arranged in the lower portion of the matrix, such that the signal trend represented by the elements of the matrix corresponding to Spatial layer 2 is also from strong to weak, which is aligned with the signal trend represented by the elements in the matrix corresponding to Spatial layer 1.

Note that the arrangement shown in FIG. 10 is just exemplary without limitation and the number of spatial layers at the UE side is not limited to 2. The UE can arrange the submatrices for different spatial layers (e.g. more than 2) as long as the signal trends represented by the matrices corresponding to the different spatial layers are aligned (e.g. either from strong to weak or from weak to strong).

The above has detailly described the modes of implementation of the first embodiments of the present disclosure. As described above, the matrix related to CSI feedback is generated by arranging the vectors in a first dimension according to different polarizations of the transmission antenna(s) of the gNB to reduce the fluctuation in the matrix. The second embodiment of the present disclosure provides another solution to reduce such a fluctuation.

Figure 11:
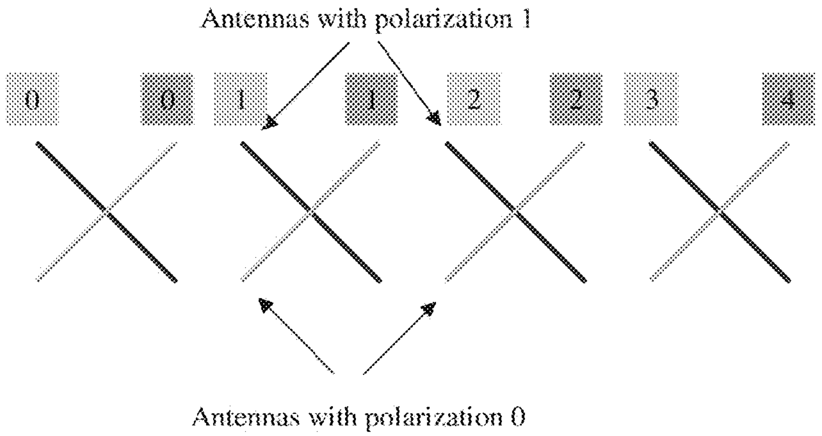
FIG. 11 illustrates an example approach for arranging the matrix related to CSI feedback to be processed by a neural network according to a second embodiment of the present disclosure.

FIG. 11 illustrates an example approach for arranging the matrix related to CSI feedback to be processed by the NN according to the second embodiment of the present disclosure. According to the second embodiment of the present disclosure, instead of taking the entire matrix related to CSI feedback comprising vectors associated with different polarizations of the transmission antenna(s) of the gNB, the UE can arrange the matrix by splitting it into separate submatrices each comprising vectors in the first dimension associated with a same polarization of the transmission antenna(s) of the gNB.

FIG. 11 shows the case that the gNB uses 8 antenna ports 0-7 with two polarizations (polarization 0 and polarization 1) for transmission. Under such a case, the antenna ports with polarization 1 are iterated to generate a submatrix, and the antenna ports with polarization 0 are iterated to generate another submatrix. Therefore, at least two separate matrices can be input into the NN as two separate input channels for processing.

Please note that directly generating the matrix by iterating the antenna ports according to polarizations is merely an example of implementation without limitation. The UE can use any suitable approach to generate the matrix as long as the elements in the matrix are arranged according to the polarizations according to the principle of the present disclosure. For example, the UE can firstly determine an initial matrix related to CSI-RS and then split the matrix according to polarizations of the transmission antenna(s) of the gNB.

Similar to the first embodiment, according to a first mode of implementation of the second embodiment, the NN can be a real-value neural network which may not have the ability to handle complex values. In view of this, according to the first mode of implementation of the second embodiment, the UE can arrange the matrix related to CSI feedback by splitting it into a submatrix (in order to avoid any ambiguity with the first embodiment, a third submatrix) containing elements each corresponding to a real part value of each element associated with one polarization of the matrix, a fourth submatrix containing elements each corresponding to a real part value of each element associated with another polarization of the matrix, a fifth submatrix containing elements each corresponding to an imaginary part value of each element associated with said one polarization of the matrix, and a sixth submatrix containing elements each corresponding to an imaginary part value of each element associated with said another polarization of the matrix. The UE can provide the third, fourth, fifth and sixth submatrix as four input channels to the NN. Note that, "splitting" the matrix into submatrices does not necessarily means there must be two steps (i.e. firstly generating the initial complex matrix related to CSI feedback and then splitting the complex matrix into submatrices), but the UE can implicitly split the matrix by directly generating four submatrices according to the above described arrangement respectively.

Figure 12:
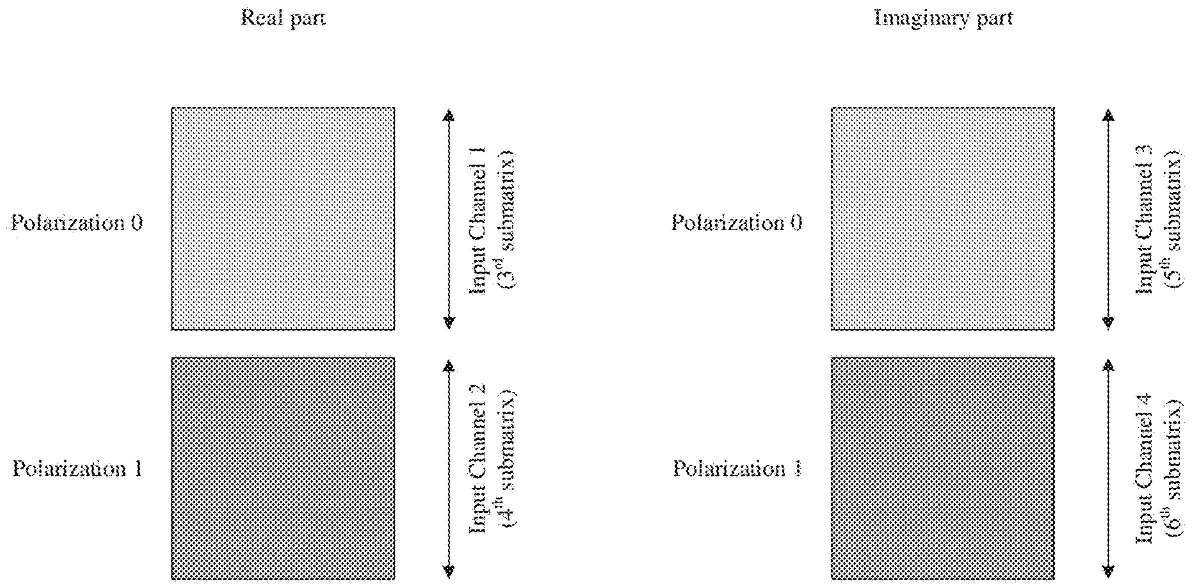
FIG. 12 illustrates an example arrangement for the matrix related to CSI feedback to be processed by a neural network according to a first implementation of a second embodiment of the present disclosure.

FIG. 12 illustrates an example arrangement for the matrix related to CSI feedback to be processed by the NN according to the first mode of implementation of the second embodiment.

As shown in FIG. 12, for one spatial layer at the UE side, the UE can generate four separate submatrices (the $3^{rd}$ submatrix for the real part associated with Polarization 0, the $4^{th}$ submatrix for the real part associated with Polarization 1, the $5^{th}$ submatrix for the imaginary part associated with Polarization 0, and the $6^{th}$ submatrix for the imaginary part associated with Polarization 1) as four separate input channels (Input Channel 1-Input Channel 4) for the NN. Each submatrix is associated with a same polarization of the transmission antenna(s) of the gNB. Therefore, in each submatrix, there is no fluctuation caused by polarizations of the transmission antenna(s) of the gNB, which is favorable for the NN to process.

The arrangement for the matrix related to CSI feedback corresponding to one spatial layer at the UE side has been detailly explained above.

Similar to the first embodiment, when the UE supports multiple spatial layers, signal trends represented by elements in the submatrices input into the NN via different input channels may vary depending on the polarizations of the transmission antenna(s) of the gNB. Therefore, there is a need to arrange the order for inputting the four submatrices into the NN so that the signal represented by a same input channel refers to same characteristics of the matrix, e.g. among different spatial layers, the signal strength represented by elements of a respective submatrix input into a same input channel refer to a same strength depending on the polarizations.

According to a variation to the first mode of implementation of the second embodiments, for more than one spatial layer at the UE side, the UE may generate more than one matrix related to CSI feedback, each matrix may correspond to one spatial layer at the UE side. For each of said more than one matrix, the UE may arrange the order for inputting the above mentioned third submatrix, fourth submatrix, fifth submatrix, and sixth submatrix into the NN such that among the more than one spatial layer, signal trends from the third submatrix to the fourth submatrix of different spatial layers are aligned and signal trends from the fifth submatrix to the sixth submatrix of different spatial layers are aligned, such a signal trend can be represented by elements in respective submatrices.

Figure 13:
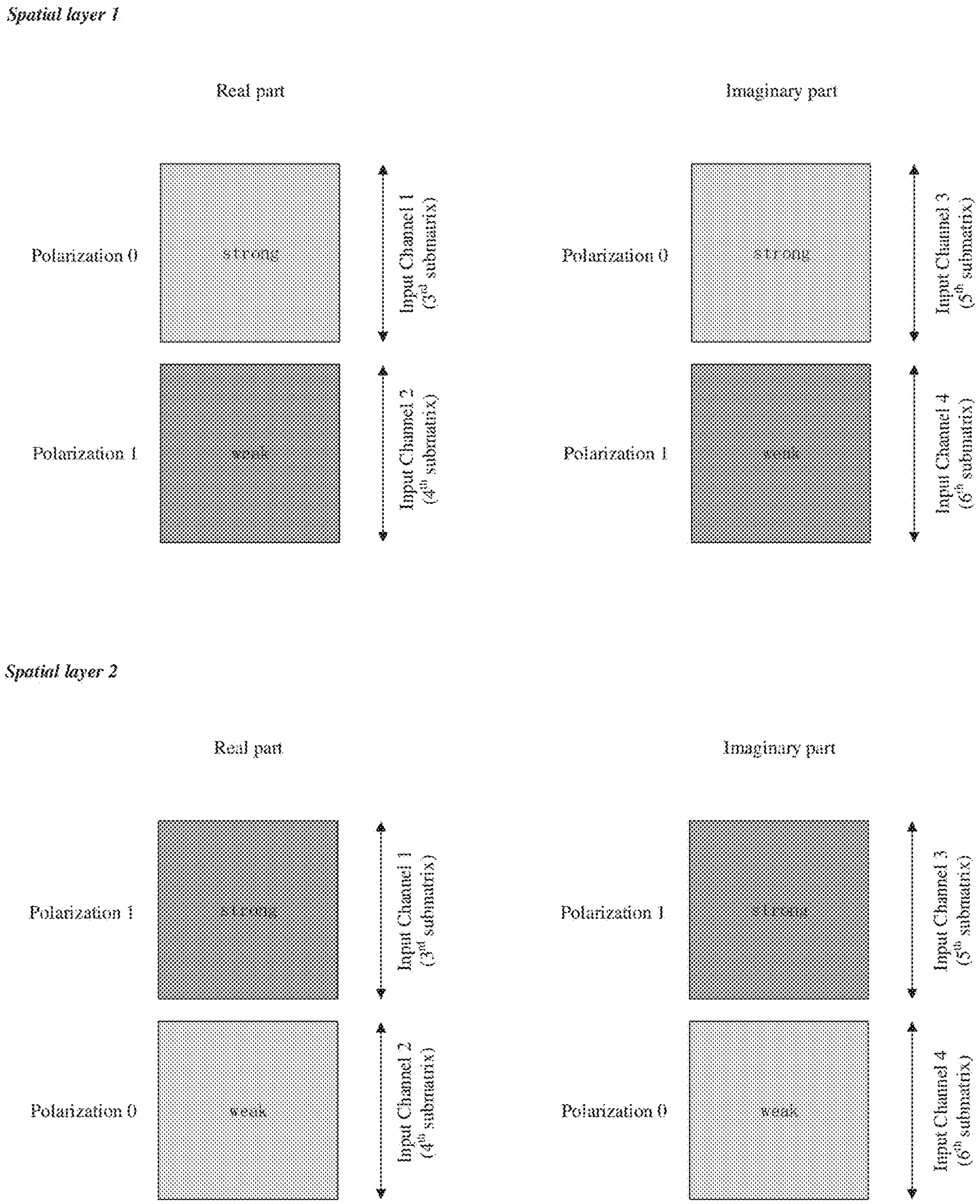
FIG. 13 illustrates an example arrangement for the matrix related to CSI feedback to be processed by a neural network according to a variation of a first implementation of a second embodiment of the present disclosure.

FIG. 13 illustrates an example arrangement for the matrix related to CSI feedback to be processed by the NN according to the above-described variation of the first implementation of the second embodiment of the present disclosure.

FIG. 13 illustrates the case where there are two spatial layers at UE side. As shown in FIG. 13, for Spatial layer 1, the $3^{rd}$ submatrix for the real part associated with Polarization 0 is input as the Input Channel 1 of the NN, the $4^{th}$ submatrix for the real part associated with Polarization 1 is input as the Input Channel 2 of the NN, the $5^{th}$ submatrix for the imaginary part associated with Polarization 0 is input as Input Channel 3 of the NN, and the $6^{th}$ submatrix for the imaginary part associated with Polarization 1 is input as Input Channel 4 of the NN. While, for Spatial layer 2, the $3^{rd}$ submatrix for the real part associated with Polarization 1 is input as the Input Channel 1 of the NN, the $4^{th}$ submatrix for the real part associated with Polarization 0 is input as the Input Channel 2 of the NN, the $5^{th}$ submatrix for the imaginary part associated with Polarization 1 is input as Input Channel 3 of the NN, and the $6^{th}$ submatrix for the imaginary part associated with Polarization 0 is input as Input Channel 4 of the NN. Therefore, by arranging the input order of the submatrices for Spatial layer 1 and Spatial layer 2, the signal trend represented by elements in the $3^{rd}$ submatrix and the $4^{th}$ submatrix of Spatial layer 2 from the $3^{rd}$ submatrix to the $4^{th}$ submatrix is from strong to weak, which is aligned with the signal trend represented by elements in the $3^{rd}$ submatrix and the $4^{th}$ submatrix of Spatial layer 1 from the $3^{rd}$ submatrix to the $4^{th}$ submatrix. Similarly, the signal trend represented by elements in the $5^{th}$ submatrix and the $6^{th}$ submatrix of Spatial layer 2 from the $5^{th}$ submatrix to the $6^{th}$ submatrix is from strong to weak, which is aligned with the signal trend represented by elements in the $5^{th}$ submatrix and $6^{th}$ submatrix of Spatial layer 1 from the $5^{th}$ submatrix to the $6^{th\ h}$ submatrix.

Note that the arrangement shown in FIG. 13 is just exemplary without limitation and the number of spatial layers at the UE side is not limited to 2. The UE can arrange the order of the submatrices for different spatial layers (e.g. more than 2) as long as the signal trends represented by the submatrices corresponding to the different spatial layers are aligned (e.g. either from strong to weak or from weak to strong).

With such an arrangement, among the four input channels of the NN, the characteristics of the input information are unified, such that the NN is able to better process the input matrices related to CSI feedback.

According to a second mode of implementation of the second embodiment, the NN can be a complex-value neural network which may have the ability to handle both real values and complex values. In view of this, according to the second mode of implementation of the second embodiment, different from the first mode of implementation, the UE does not need to split the complex matrix related to CSI feedback into submatrices each corresponding to the real part and the imaginary part. Instead, the UE can arrange the matrix related to CSI feedback by simply splitting it into a first complex submatrix containing elements each corresponding to each element associated with one polarization of the matrix, and a second complex submatrix containing elements each corresponding to each element associated with another polarization of the matrix, and input the first complex submatrix and the second complex submatrix as two input channels into the NN for processing.

Figure 14:
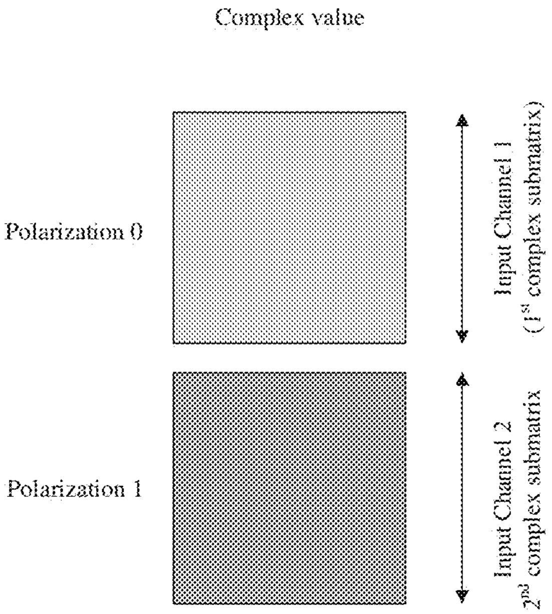
FIG. 14 illustrates an example arrangement for the matrix related to CSI feedback to be processed by a neural network according to a second implementation of a first embodiment of the present disclosure.

FIG. 14 illustrates an example arrangement for the matrix related to CSI feedback to be processed by the NN according to the second mode of implementation of the second embodiment.

As shown in FIG. 14, for one spatial layer at the UE side, the matrix related to CSI feedback can be arranged by splitting it into a $1^{st}$ complex submatrix containing elements associated with Polarization 0 of the transmission antenna(s) of the gNB and a $2^{nd}$ complex submatrix containing elements associated with Polarization 1 of the transmission antenna(s) of the gNB. The UE can input the $1^{St}$ complex submatrix as the Input Channel 1 into the NN and input the $2^{nd}$ complex submatrix as the Input Channel 2 into the NN.

As described above, similarly to the variation to the second mode of implementation of the second embodiment, when the UE supports multiple spatial layers, among different matrices corresponding to the multiple spatial layers, there is a need to arrange the order for inputting the two complex submatrices into the NN so that the signal represented by a same input channel refers to same characteristics of the matrix, e.g. among different spatial layers, the signal strength represented by elements of a respective submatrix input into a same input channel refer to a same strength depending on the polarizations.

According to a variation to the second mode of implementation of the second embodiments, for more than one spatial layer at the UE side, the UE may generate more than one matrix related to CSI feedback, each matrix may correspond to one spatial layer at the UE side. For each of said more than one matrix, the UE may arrange an order for inputting the above mentioned first complex submatrix, and the second complex submatrix into the NN such that among the more than one spatial layer, signal trends from the first complex submatrix to the second complex submatrix of different spatial layers are aligned, such a signal trend can be represented by elements in respective submatrices.

Figure 15:
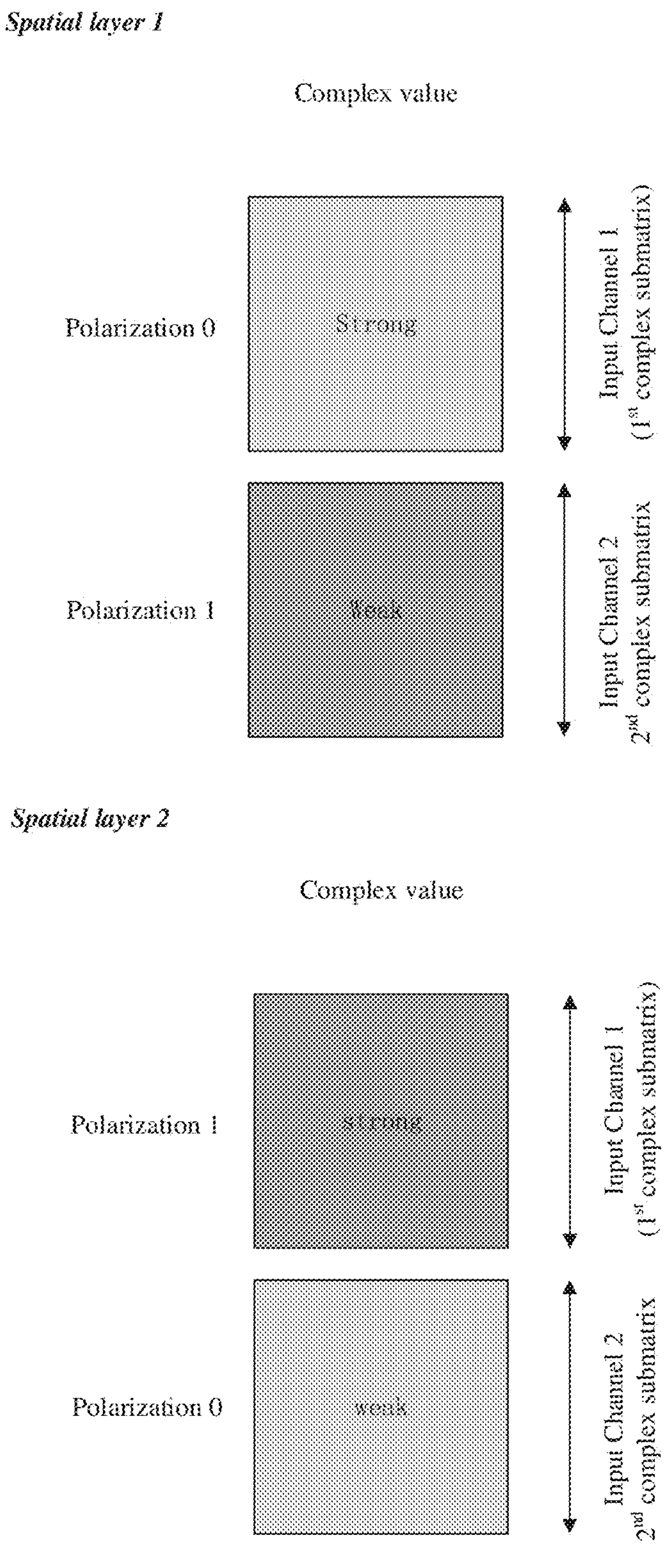
FIG. 15 illustrates an example arrangement for the matrix related to CSI feedback to be processed by a neural network according to a variation of a second implementation of a second embodiment of the present disclosure.

FIG. 15 illustrates an example arrangement for the matrix related to CSI feedback to be processed by the NN according to the above-described variation of the second implementation of the second embodiment of the present disclosure.

FIG. 15 illustrates the case where there are two spatial layers at UE side. As shown in FIG. 15, for Spatial layer 1, the 1st complex submatrix associated with Polarization 0 is input as the Input Channel 1 of the NN and the $2^{nd}$ complex submatrix associated with Polarization 1 is input as the Input Channel 2 of the NN. While, for Spatial layer 2, the $1^{st}$ complex submatrix associated with Polarization 1 is input as the Input Channel 1 of the NN and the $2^{nd}$ complex submatrix associated with Polarization 0 is input as the Input Channel 2 of the NN. Therefore, by arranging the input order of the submatrices for Spatial layer 1 and Spatial layer 2, the signal trend represented by elements in the $1^{st}$ complex submatrix and the $2^{nd}$ complex submatrix of Spatial layer 2 from the $1^{st}$ complex submatrix to the $2^{nd}$ complex submatrix is from strong to weak, which is aligned with the signal trend represented by elements in the $1^{st}$ complex submatrix and the $2^{nd}$ complex submatrix of Spatial layer 1 from the $1^{st}$ complex submatrix to the $2^{nd}$ complex submatrix.

Note that the arrangement shown in FIG. 15 is just exemplary without limitation and the number of spatial layers at the UE side is not limited to 2. The UE can arrange the order of the submatrices for different spatial layers (e.g. more than 2) as long as the signal trends represented by the submatrices corresponding to the different spatial layers are aligned (e.g. either from strong to weak or from weak to strong).

With such an arrangement, among the two input channels of the NN, the characteristics of the input information are unified, such that the NN is able to better process the input matrices related to CSI feedback.

If the NN is a real-value neural network, and the matrix related CSI feedback is split into a submatrix for real part and a submatrix for imaginary part, the information indicating the dependence between the real parts and the imaginary parts of the initial complex values may be lost. Such information may be useful for the NN. For example, if such information is also available for the NN to process, the output of the NN may obtain a better degree of compression and/or a prediction for a longer period of time.

In view of this, according to the third embodiment of the present disclosure, the UE may input, into the NN, information indicating dependence between a real part and an imaginary part of each element of each matrix related to CSI feedback via one or more additional input channels. For example, the information can be any one or more of: an absolute value of $\sqrt{I^2+Q^2}$, $|I^2+Q^2|$, $\max(|I|, |Q|)$, and $(|I|^{\alpha}+|Q|^{\alpha})^{1/\alpha}$, wherein I and Q are signal components corresponding to a complex value of an element in one of the at least one matrix, and a can be any positive number. Note that the information recited herein indicating dependence between a real part and an imaginary part of each element of each matrix related to CSI feedback is just exemplary without limitation. Any other information can be used as long as such information is able to reflect the dependence or relationship between the real part and the imaginary part of each element of the matrix.

According to the present disclosure, the third embodiment can be realized in combination with any of the first embodiment and the second embodiment in the case of the NN being a real-value neural network.

The conception and implementation details of the present disclosure has been described above. Please note that the present description mainly describes how to arrange the matrix to be processed by the NN. In fact, during the training of the NN, the matrices for training the NN can be arranged in a similar way as described above.

As described above with reference to FIG. 3, upon obtaining the output (e.g. compressed information and/or predicted information corresponding to the input CSI feedback information) from the NN, the UE can transmit information indicating the output to the gNB. Upon receiving such information, the gNB can input the information into another NN for processing. After such processing, the gNB can obtain a restored at least one matrix related to the CSI feedback corresponding to the input at least one matrix at the UE side.

Particularly, the gNB can receive information indicating CSI feedback from the UE; input the information into a NN; and obtain an output from the NN. The output can be at least one matrix related to the CSI feedback. Each matrix of the at least one matrix corresponds to one spatial layer of at least one spatial layer at the wireless device. For each of the at least one matrix, the matrix comprises a plurality of vectors in a first dimension, a number of said plurality of vectors being the same as a size of a second dimension of the matrix, a number of elements in each of the plurality of vectors being the same as a size of the first dimension of the matrix, and the plurality of vectors belonging to at least two groups, each group of vectors being associated with a same polarization of at least one antenna of the gNB, and the plurality of vectors being associated with two different polarizations of the at least one antenna. Each of the at least one matrix can be arranged such that vectors in the first dimension associated with a same polarization are arranged next to each other.

For example, the rules (e.g. whether to split the initial matrix related to CSI feedback and how to split it, which input channel corresponds to which part of the initial matrix, what is the signal trend (e.g. from strong to weak or from weak to strong) represented by a matrix or a pair of matrices, etc. as described above) for arranging the input matrices into the NN can be known to the UE and the gNB. For example, the rules can be predetermined in the standard or can be renegotiated via any suitable signaling/messages. Based on such rules, the gNB can determine the actual precoding matrices based on the output of the NN e.g. by rearranging the output matrix and/or executing any suitable processing.

Figure 16:
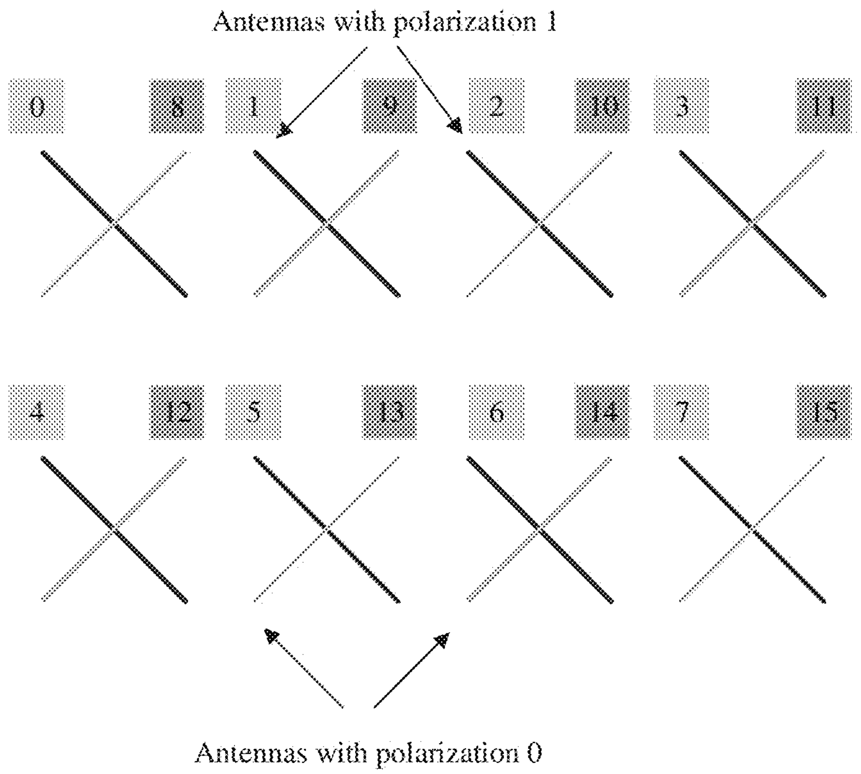
FIG. 16 illustrates the indexing scheme of antenna ports according some embodiments of the present disclosure.

In the above, a number of embodiments are provided to mitigate signal level fluctuation due to the use of transmit antennas at different polarizations. In addition to those embodiments, or separate from those embodiments, considering the transmission antennas of the gNB are placed as an antenna array, the following observation exists: the signal level fluctuation across antenna ports in the same column can be different from the signal level fluctuation across antenna ports in the same row. Such a difference can be caused by the beam width difference between the elevation domain and the horizontal domain, and/or antenna spacings in the elevation domain and the horizontal domain. In FIG. 16, it is shown within a same polarization, transmit antenna ports are iterated over in a row-first fashion in the enumeration of antenna ports in the input matrix, e.g., indexing with [0, 1, 2, 3, 4, 5, 6, 7] for polarization at 45 degrees (i.e. polarization 1) and indexing with [8, 9, 10, 11, 12, 13, 14, 15] for polarization at −45 degrees (i.e. polarization 0), which may lead to better performance of NN than the case where transmit antenna ports are iterated over in a column-first fashion in the enumeration of antenna ports in the input matrix, e.g, indexing with [0, 4, 1, 5, 2, 6, 3, 7] for polarization at 45 degrees (i.e. polarization 1) and indexing with [8, 12, 9, 13, 10, 14, 11, 15] for polarization at −45 degrees (i.e. polarization 0). Hence an indexing scheme of antenna ports in a 2D antenna array (e.g., $N_1$ for the number of rows and $N_2$ for the number of columns), i.e. either following the row-first fashion or the column first fashion, can be considered in the antenna port arrangement or spatial beam arrangement for the precoding matrix. The indexing scheme can be specified in the standard specification, or signaled by the network through RRC signaling or MAC CE, e.g. in one cell which favors the row-first indexing, and another cell which favors the column-first indexing, the signaled indexing scheme can be different, Further, it may be possible not all UEs support both indexing schemes, then a UE capability indicating a UE's support of the row-first indexing and/or column-first indexing can be introduced, and consequently the network is constrained by signaling an supported indexing scheme to a UE. To save on signaling overhead, a default indexing scheme may be assumed if the UE supports neural-network enabled CSI feedback, but it does not explicitly indicate the supported indexing scheme(s). For whatever indexing scheme is adopted on the UE side, the same assumption on the indexing scheme is taken on the network side to recover the precoding matrix.

Figure 17:
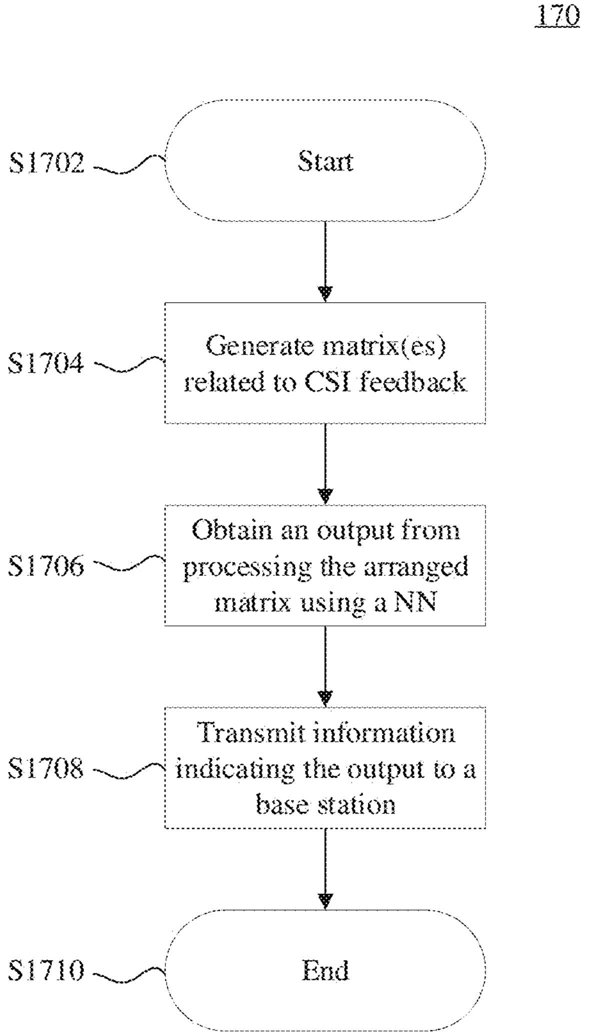
FIG. 17 illustrates an example flow diagram for a wireless device according to the present disclosure.

FIG. 17 is a flow diagram illustrating an example method 170 for CSI feedback considering polarizations for a wireless device (e.g. a UE).

The method starts at S1702.

At S1704, the wireless device may generate at least one matrix related to CSI feedback, wherein each matrix of the at least one matrix corresponds to one spatial layer of at least one spatial layer at the wireless device. For each of the at least one matrix, the matrix comprises a plurality of vectors in a first dimension, a number of said plurality of vectors being the same as a size of a second dimension of the matrix, a number of elements in each of the plurality of vectors being the same as a size of the first dimension of the matrix, and the plurality of vectors belonging to at least two groups, each group of vectors being associated with a same polarization of at least one antenna of a cellular base station, and the plurality of vectors being associated with two different polarizations of the at least one antenna of the cellular base station, wherein each of the at least one matrix is arranged by arranging the plurality of vectors in the first dimension according to the polarizations such that vectors associated with a same polarization are arranged next to each other. The wireless device can generate the at least one matrix related to CSI feedback according to any of the above-described embodiments.

At S1706, the wireless device may obtain an output from processing the arranged at least one matrix using a neural network.

At S1708, the wireless device may transmit information indicating the output to the base station.

The method ends at S1710.

Embodiments contemplated herein include an apparatus comprising means to perform one or more elements of the method CSI feedback considering polarizations for a wireless device. This apparatus may be, for example, an apparatus of a UE (such as a wireless device 202 that is a UE, as described herein).

Embodiments contemplated herein include one or more non-transitory computer-readable media comprising instructions to cause an electronic device, upon execution of the instructions by one or more processors of the electronic device, to perform one or more elements of the method CSI feedback considering polarizations for a wireless device. This non-transitory computer-readable media may be, for example, a memory of a UE (such as a memory 206 of a wireless device 202 that is a UE, as described herein).

Embodiments contemplated herein include an apparatus comprising logic, modules, or circuitry to perform one or more elements of the method CSI feedback considering polarizations for a wireless device. This apparatus may be, for example, an apparatus of a UE (such as a wireless device 202 that is a UE, as described herein).

Embodiments contemplated herein include an apparatus comprising: one or more processors and one or more computer-readable media comprising instructions that, when executed by the one or more processors, cause the one or more processors to perform one or more elements of the method CSI feedback considering polarizations for a wireless device. This apparatus may be, for example, an apparatus of a UE (such as a wireless device 202 that is a UE, as described herein).

Embodiments contemplated herein include a signal as described in or related to one or more elements of the method CSI feedback considering polarizations for a wireless device.

Embodiments contemplated herein include a computer program or computer program product comprising instructions, wherein execution of the program by a processor is to cause the processor to carry out one or more elements of the method CSI feedback considering polarizations for a wireless device. The processor may be a processor of a UE (such as a processor(s) 204 of a wireless device 202 that is a UE, as described herein). These instructions may be, for example, located in the processor and/or on a memory of the UE (such as a memory 206 of a wireless device 202 that is a UE, as described herein).

Figure 18:
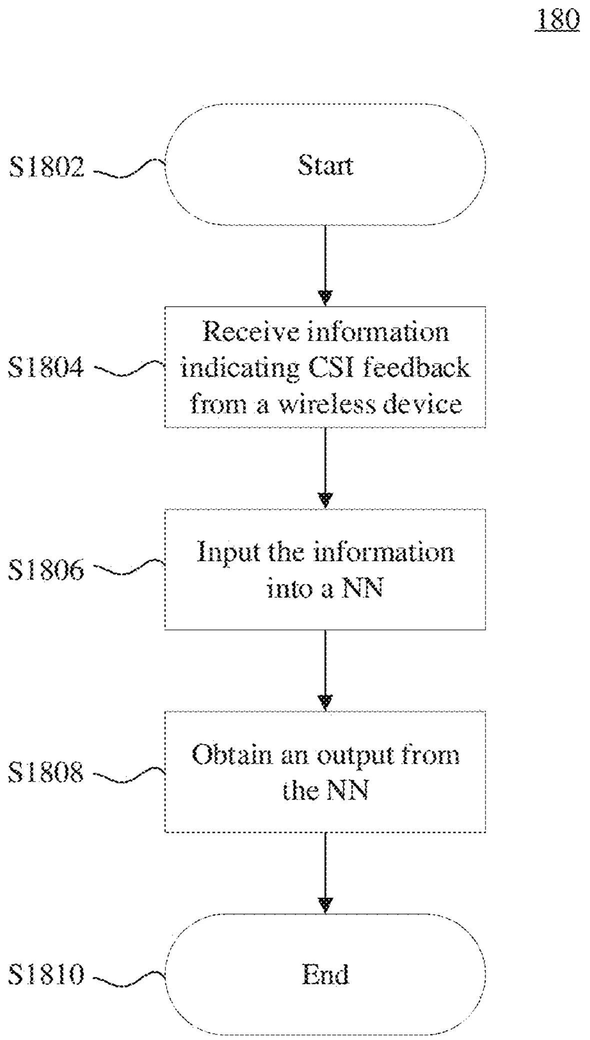
FIG. 18 illustrates an example flow diagram for a network device according to the present disclosure.

FIG. 18 is a flow diagram illustrating an example method 180 for CSI feedback considering polarizations for a network device (e.g., a gNB).

The method starts at S1802.

At S1804, the network device may receive information indicating CSI feedback from a wireless device.

At S1806, the network device may input the information into a neural network.

At S1808, the network device may obtain an output from the neural network. The output may be at least one matrix related to the CSI feedback, each matrix of the at least one matrix corresponding to one spatial layer of at least one spatial layer at the wireless device. For each of the at least one matrix, the matrix comprises a plurality of vectors in a first dimension, a number of said plurality of vectors being the same as a size of a second dimension of the matrix, a number of elements in each of the plurality of vectors being the same as a size of the first dimension of the matrix, and the plurality of vectors belong to at least two groups, each group of vectors being associated with a same polarization of the at least one antenna, and the plurality of vectors being associated with two different polarizations of the at least one antenna, wherein each of the at least one matrix is arranged such that vectors in the first dimension associated with a same polarization are arranged next to each other.

The method ends at S1810.

Embodiments contemplated herein include an apparatus comprising means to perform one or more elements of the method CSI feedback considering polarizations for a network device. This apparatus may be, for example, an apparatus of a base station (such as a network device 218 that is a base station, as described herein).

Embodiments contemplated herein include one or more non-transitory computer-readable media comprising instructions to cause an electronic device, upon execution of the instructions by one or more processors of the electronic device, to perform one or more elements of the method CSI feedback considering polarizations for a network device. This non-transitory computer-readable media may be, for example, a memory of a base station (such as a memory 222 of a network device 218 that is a base station, as described herein).

Embodiments contemplated herein include an apparatus comprising logic, modules, or circuitry to perform one or more elements of the method CSI feedback considering polarizations for a network device. This apparatus may be, for example, an apparatus of a base station (such as a network device 218 that is a base station, as described herein).

Embodiments contemplated herein include an apparatus comprising: one or more processors and one or more computer-readable media comprising instructions that, when executed by the one or more processors, cause the one or more processors to perform one or more elements of the method CSI feedback considering polarizations for a network device. This apparatus may be, for example, an apparatus of a base station (such as a network device 218 that is a base station, as described herein).

Embodiments contemplated herein include a signal as described in or related to one or more elements of the method CSI feedback considering polarizations for a network device.

Embodiments contemplated herein include a computer program or computer program product comprising instructions, wherein execution of the program by a processing element is to cause the processing element to carry out one or more elements of the method CSI feedback considering polarizations for a network device. The processor may be a processor of a base station (such as a processor(s) 220 of a network device 218 that is a base station, as described herein). These instructions may be, for example, located in the processor and/or on a memory of the UE (such as a memory 222 of a network device 218 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The above has described in detail the machine learning for CSI feedback considering polarizations. In addition, the present disclosure can also have any of the configurations below.

One set of aspects may include a wireless device, comprising: at least one antenna; at least one radio coupled to the at least one antenna; and a processor coupled to the at least one radio; wherein the processor is configured to generate at least one matrix related to channel state information (CSI) feedback, wherein each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of at least one antenna of a cellular base station, and said plurality of vectors are associated with two different polarizations of the at least one antenna of the cellular base station, wherein each of the at least one matrix is arranged by arranging said plurality of vectors in the first dimension according to the polarizations such that vectors associated with a same polarization are arranged next to each other; obtain an output from processing the arranged at least one matrix using a neural network (NN); and transmit, via the at least one radio, information indicating the output to the cellular base station.

According to some aspects, the NN is a real-value neural network.

According to some aspects, the NN is a complex-value neural network.

According to some aspects, the processor configured to obtain the output using the NN is further configured to: arrange each of the at least one matrix by splitting the matrix into a first submatrix containing elements each corresponding to a real part value of each element of the matrix, and a second submatrix containing elements each corresponding to an imaginary part value of each element of the matrix, wherein the first submatrix and the second submatrix are arranged according to said two different polarizations such that vectors in the first dimension in the first submatrix associated with a same polarization are arranged next to each other and vectors in the first dimension in the second submatrix associated with a same polarization are arranged next to each other, and input the first submatrix and the second submatrix as two input channels into the neural network.

According to some aspects, in the case of more than one spatial layer at the wireless device, the processor is configured to generate more than one matrix related to CSI feedback, each matrix of said more than one matrix corresponds to one spatial layer of said more than one spatial layer, wherein, the processor is further configured to arrange said more than one matrix such that among the first submatrices of said more than one matrix corresponding to said more than one spatial layer, the arrangements of the groups of vectors associated with said two different polarizations in the first submatrices of said more than one matrix are aligned such that signal trends depending on said two different polarizations represented by elements in the first submatrices of said more than one matrix are aligned, and among the second submatrices of said more than one matrix corresponding to said more than one spatial layer, the arrangements of the groups of vectors associated with said two different polarizations in the second submatrices of said more than one matrix are aligned such that signal trends depending on said two different polarizations represented by elements in the second submatrices of said more than one matrix are aligned.

According to some aspects, the processor configured to obtain the output using the NN is further configured to: arrange each of the at least one matrix by splitting the matrix into a third submatrix containing elements each corresponding to a real part value of each element associated with one polarization of the matrix, a fourth submatrix containing elements each corresponding to a real part value of each element associated with another polarization of the matrix, a fifth submatrix containing elements each corresponding to an imaginary part value of each element associated with said one polarization of the matrix, and a sixth submatrix containing elements each corresponding to an imaginary part value of each element associated with said another polarization of the matrix, and input the third submatrix, fourth submatrix, fifth submatrix, and sixth submatrix as four input channels into the NN.

According to some aspects, wherein in the case of more than one spatial layer at the wireless device, the processor is configured to generate more than one matrix related to CSI feedback, each matrix of said more than one matrix corresponds to one spatial layer of said more than one spatial layer, wherein, the processor is further configured to for each of said more than one matrix, arrange an order for inputting the third submatrix, fourth submatrix, fifth submatrix, and sixth submatrix into the NN such that among said more than one spatial layer, signal trends depending on said two different polarizations represented by elements in the third submatrix and the fourth submatrix from the third submatrix to the fourth submatrix of different spatial layers are aligned and signal trends depending on said two different polarizations represented by elements in the fifth submatrix and the sixth submatrix from the fifth submatrix to the sixth submatrix of different spatial layers are aligned.

According to some aspects, the processor configured to obtain the output using the NN is further configured to: for each spatial layer, input a corresponding arranged matrix as a single input channel into the NN.

According to some aspects, in the case of more than one spatial layer at the wireless device, the processor is configured to generate more than one matrix related to CSI feedback, each matrix of said more than one matrix corresponds to one spatial layer of said more than one spatial layer, wherein, the processor is further configured to arrange said more than one matrix such that among said more than one matrix corresponding to said more than one spatial layer, the arrangements of the groups of vectors associated with said two different polarizations in said more than one matrix are aligned such that signal trends depending on said two different polarizations represented by elements in said more than matrix are aligned.

According to some aspects, the processor configured to obtain the output using the NN is further configured to: arrange each of the at least one matrix by splitting the matrix into a first complex submatrix containing elements each corresponding to each element associated with one polarization of the matrix, and a second complex submatrix containing elements each corresponding to each element associated with another polarization of the matrix, and input the first complex submatrix and the second complex submatrix as two input channels into the NN.

According to some aspects, in the case of more than one spatial layer at the wireless device, the processor is configured to generate more than one matrix related to CSI feedback, each matrix of said more than one matrix corresponds to one spatial layer of said more than one spatial layer, wherein, the processor is further configured to for each of said more than one matrix, arrange an order for inputting the first complex submatrix and the second complex submatrix into the NN such that among said more than one spatial layer, signal trends depending on said two different polarizations represented by elements in the first complex submatrix and the second complex submatrix from the first complex submatrix to the second complex submatrix are aligned.

According to some aspects, the processor is further configured to input, into the NN, information indicating dependence between a real part and an imaginary part of each element of each of the at least one matrix via one or more additional input channels.

According to some aspects, the information is any one or more of: an absolute value of $\sqrt{I^2+Q^2}$, $|I^2+Q^2|$, $\max(|I|, |Q|)$, and $(|I|^{\alpha}+|Q|^{\alpha})^{1/\alpha}$, wherein I and Q are signal components corresponding to a complex value of an element in one of the at least one matrix, and a is a positive number.

According to some aspects, each of the at least one matrix is any of a channel matrix for at least one sub-band, a precoding matrix for at least one sub-band, a precoding matrix associated with at least one indicated spatial beam for at least one sub-band or a precoding matrix associated with at least one indicated spatial beam and at least one indicated delay.

According to some aspects, the output is compressed information and/or predicted information corresponding to the at least one matrix.

One set of aspects may include a cellular base station, comprising: at least one antenna; at least one radio coupled to the at least one antenna; and a processor coupled to the at least one radio; wherein the processor is configured to: receive, via the at least one radio, information indicating channel state information (CSI) feedback from a wireless device; input the information into a neural network; and obtain an output from the neural network, wherein the output is at least one matrix related to the CSI feedback, each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of the at least one antenna, and said plurality of vectors are associated with two different polarizations of the at least one antenna, and wherein each of the at least one matrix is arranged such that vectors in the first dimension associated with a same polarization are arranged next to each other.

One set of aspects may include a method for a wireless device, comprising: generating at least one matrix related to channel state information (CSI) feedback, wherein each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of at least one antenna of a cellular base station, and said plurality of vectors are associated with two different polarizations of the at least one antenna of the cellular base station, wherein each of the at least one matrix is arranged by arranging said plurality of vectors in the first dimension according to the polarizations such that vectors associated with a same polarization are arranged next to each other; obtaining an output from processing the arranged at least one matrix using a neural network (NN); and transmitting, via the at least one radio, information indicating the output to the cellular base station.

According to some aspects, the neural network is a real-value neural network.

According to some aspects, the neural network is a complex-value neural network.

According to some aspects, the method further comprising arranging each of the at least one matrix by splitting the matrix into a first submatrix containing elements each corresponding to a real part value of each element of the matrix, and a second submatrix containing elements each corresponding to an imaginary part value of each element of the matrix, wherein the first submatrix and the second submatrix are arranged according to said two different polarizations such that vectors in the first dimension in the first submatrix associated with a same polarization are arranged next to each other and vectors in the first dimension in the second submatrix associated with a same polarization are arranged next to each other, and inputting the first submatrix and the second submatrix as two input channels into the neural network.

According to some aspects, in the case of more than one spatial layer at the wireless device, the method comprising generating more than one matrix related to CSI feedback, each matrix of said more than one matrix corresponds to one spatial layer of said more than one spatial layer, wherein, the method further comprising arranging said more than one matrix such that among the first submatrices of said more than one matrix corresponding to said more than one spatial layer, the arrangements of the groups of vectors associated with said two different polarizations in the first submatrices of said more than one matrix are aligned such that signal trends depending on said two different polarizations represented by elements in the first submatrices of said more than one matrix are aligned, and among the second submatrices of said more than one matrix corresponding to said more than one spatial layer, the arrangements of the groups of vectors associated with said two different polarizations in the second submatrices of said more than one matrix are aligned such that signal trends depending on said two different polarizations represented by elements in the second submatrices of said more than one matrix are aligned.

According to some aspects, the method further comprising arranging each of the at least one matrix by splitting the matrix into a third submatrix containing elements each corresponding to a real part value of each element associated with one polarization of the matrix, a fourth submatrix containing elements each corresponding to a real part value of each element associated with another polarization of the matrix, a fifth submatrix containing elements each corresponding to an imaginary part value of each element associated with said one polarization of the matrix, and a sixth submatrix containing elements each corresponding to an imaginary part value of each element associated with said another polarization of the matrix, and inputting the third submatrix, fourth submatrix, fifth submatrix, and sixth submatrix as four input channels into the NN.

According to some aspects, in the case of more than one spatial layer at the wireless device, the method comprising generating more than one matrix related to CSI feedback, each matrix of said more than one matrix corresponds to one spatial layer of said more than one spatial layer, wherein, the method further comprising for each of said more than one matrix, arranging an order for inputting the third submatrix, fourth submatrix, fifth submatrix, and sixth submatrix into the NN such that among said more than one spatial layer, signal trends depending on said two different polarizations represented by elements in the third submatrix and the fourth submatrix from the third submatrix to the fourth submatrix of different spatial layers are aligned and signal trends depending on said two different polarizations represented by elements in the fifth submatrix and the sixth submatrix from the fifth submatrix to the sixth submatrix of different spatial layers are aligned.

According to some aspects, the method further comprising for each spatial layer, inputting a corresponding arranged matrix as a single input channel into the NN.

According to some aspects, in the case of more than one spatial layer at the wireless device, the method comprising generating more than one matrix related to CSI feedback, each matrix of said more than one matrix corresponds to one spatial layer of said more than one spatial layer, wherein, the method further comprising arranging said more than one matrix such that among said more than one matrix corresponding to said more than one spatial layer, the arrangements of the groups of vectors associated with said two different polarizations in said more than one matrix are aligned such that signal trends depending on said two different polarizations represented by elements in said more than matrix are aligned.

According to some aspects, the method further comprising arranging each of the at least one matrix by splitting the matrix into a first complex submatrix containing elements each corresponding to each element associated with one polarization of the matrix, and a second complex submatrix containing elements each corresponding to each element associated with another polarization of the matrix, and inputting the first complex submatrix and the second complex submatrix as two input channels into the NN.

According to some aspects, in the case of more than one spatial layer at the wireless device, the method comprising generating more than one matrix related to CSI feedback, each matrix of said more than one matrix corresponds to one spatial layer of said more than one spatial layer, wherein, the method further comprising for each of said more than one matrix, arranging an order for inputting the first complex submatrix and the second complex submatrix into the NN such that among said more than one spatial layer, signal trends depending on said two different polarizations represented by elements in the first complex submatrix and the second complex submatrix from the first complex submatrix to the second complex submatrix are aligned.

According to some aspects, the method further comprising inputting, into the NN, information indicating dependence between a real part and an imaginary part of each element of each of the at least one matrix via one or more additional input channels.

One set of aspects may include a method for a cellular base station, comprising receiving information indicating channel state information (CSI) feedback from a wireless device; inputting the information into a neural network; and obtaining an output from the neural network, wherein the output is at least one matrix related to the CSI feedback, each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of the at least one antenna, and said plurality of vectors are associated with two different polarizations of the at least one antenna, and wherein each of the at least one matrix is arranged such that vectors in the first dimension associated with a same polarization are arranged next to each other.

One set of aspects may include an apparatus, comprising: a processor configured to cause a wireless device to: generate at least one matrix related to channel state information (CSI) feedback, wherein each matrix of the at least one matrix corresponds to one spatial layer of at least one spatial layer at the wireless device, and for each of the at least one matrix, the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors are associated with a same polarization of at least one antenna of a cellular base station, and said plurality of vectors are associated with two different polarizations of the at least one antenna of the cellular base station, wherein each of the at least one matrix is arranged by arranging said plurality of vectors in the first dimension according to the polarizations such that vectors associated with a same polarization are arranged next to each other; obtain an output from processing the arranged at least one matrix using a neural network (NN); and transmit information indicating the output to the cellular base station.

One set of aspects may include a computer-readable storage medium storing program instruction, wherein the program instructions, when executed by a computer system, cause the computer system to perform the method according to the above aspects.

One set of aspects may include a computer program product, comprising program instructions which, when executed by a computer, cause the computer to perform the method according to the above aspects.

What is claimed is:

1. A wireless device, comprising:

an antenna;

a radio coupled to the antenna; and a processor coupled to the radio;

wherein the processor is configured to generate a matrix related to channel state information (CSI) feedback corresponding to a first spatial layer, wherein the matrix comprises a plurality of vectors in a first dimension, a number of the plurality of vectors is the same as a size of a second dimension of the matrix, a number of elements in each of the plurality of vectors is the same as a size of the first dimension of the matrix, and the plurality of vectors belong to at least two groups including a first group of vectors associated with a first polarization and a second group of vectors associated with a second polarization different from the first polarization of an antenna of a cellular base station, wherein the matrix is arranged by arranging the plurality of vectors in the first dimension according to the polarizations such that vectors associated with a same polarization are arranged next to each other;

obtain an output from processing the matrix using a neural network (NN); and transmit, via the radio, information indicating the output to the cellular base station.

2. The wireless device of claim 1, wherein the NN is a real-value neural network.

3. The wireless device of claim 1, wherein the NN is a complex-value neural network.

4. The wireless device of claim 2, wherein the processor is configured to obtain the output using the NN is further configured to:

arrange the matrix by splitting the matrix into a first submatrix comprising elements each corresponding to a real part value of each element of the matrix, and a second submatrix comprising elements each corresponding to an imaginary part value of each element of the matrix, wherein the first submatrix and the second submatrix are arranged according to said two different polarizations such that vectors in the first dimension in the first submatrix associated with a same polarization are arranged next to each other and vectors in the first dimension in the second submatrix associated with a same polarization are arranged next to each other, and input the first submatrix and the second submatrix as two input channels into the neural network.

5. The wireless device of claim 4, wherein in a case of more than one spatial layer at the wireless device, the processor is configured to generate more than one matrices related to CSI feedback, each matrix of said more than one matrices corresponding to one spatial layer of said more than one spatial layer, wherein, the processor is further configured to arrange said more than one matrix such that among first submatrices of said more than one matrix corresponding to said more than one spatial layer, the arrangements of the groups of vectors associated with said two different polarizations in the first submatrices of said more than one matrix are aligned such that signal trends depending on said two different polarizations represented by elements in the first submatrices of said more than one matrix are aligned, and among second submatrices of said more than one matrix corresponding to said more than one spatial layer, the arrangements of the groups of vectors associated with said two different polarizations in the second submatrices of said more than one matrix are aligned such that signal trends depending on said two different polarizations represented by elements in the second submatrices of said more than one matrix are aligned.

6. The wireless device of claim 2, wherein the processor configured to obtain the output using the NN is further configured to:

arrange the matrix by splitting the matrix into a third submatrix comprising elements each corresponding to a real part value of each element associated with one polarization of the matrix, a fourth submatrix comprising elements each corresponding to a real part value of each element associated with another polarization of the matrix, a fifth submatrix comprising elements each corresponding to an imaginary part value of each element associated with said one polarization of the matrix, and a sixth submatrix comprising elements each corresponding to an imaginary part value of each element associated with said another polarization of the matrix, and input the third submatrix, fourth submatrix, fifth submatrix, and sixth submatrix as four input channels into the NN.

7. The wireless device of claim 6, wherein in a case of more than one spatial layer at the wireless device, the processor is configured to generate more than one matrix related to CSI feedback, each matrix of said more than one matrix corresponds to one spatial layer of said more than one spatial layer, wherein, the processor is further configured to for each of said more than one matrix, arrange an order for inputting the third submatrix, fourth submatrix, fifth submatrix, and sixth submatrix into the NN such that among said more than one spatial layer, signal trends depending on said two different polarizations represented by elements in the third submatrix and the fourth submatrix from the third submatrix to the fourth submatrix of different spatial layers are aligned and signal trends depending on said two different polarizations represented by elements in the fifth submatrix and the sixth submatrix from the fifth submatrix to the sixth submatrix of different spatial layers are aligned.

8. The wireless device of claim 3, wherein the processor configured to obtain the output using the NN is further configured to:

for each spatial layer, input a corresponding arranged matrix as a single input channel into the NN.

9. The wireless device of claim 8, wherein in a case of more than one spatial layer at the wireless device, the processor is configured to generate more than one matrix related to CSI feedback, each matrix of said more than one matrix corresponds to one spatial layer of said more than one spatial layer, wherein, the processor is further configured to arrange said more than one matrix such that among said more than one matrix corresponding to said more than one spatial layer, the arrangements of the groups of vectors associated with said two different polarizations in said more than one matrix are aligned such that signal trends depending on said two different polarizations represented by elements in said more than one matrix are aligned.

10. The wireless device of claim 3, wherein the processor configured to obtain the output using the NN is further configured to:

arrange the matrix by splitting the matrix into a first complex submatrix comprising elements each corresponding to each element associated with one polarization of the matrix, and a second complex submatrix comprising elements each corresponding to each element associated with another polarization of the matrix, and input the first complex submatrix and the second complex submatrix as two input channels into the NN.

11. The wireless device of claim 10, wherein in a case of more than one spatial layer at the wireless device, the processor is configured to generate more than one matrix related to CSI feedback, each matrix of said more than one matrices corresponding to one spatial layer of said more than one spatial layer, wherein the processor is further configured to for each of said more than one matrix, arrange an order for inputting the first complex submatrix and the second complex submatrix into the NN such that among said more than one spatial layer, signal trends depending on said two different polarizations represented by elements in the first complex submatrix and the second complex submatrix from the first complex submatrix to the second complex submatrix are aligned.

12. The wireless device of claim 2, wherein the processor is further configured to input, into the NN, information indicating dependence between a real part and an imaginary part of each element of the matrix via one or more additional input channels.

13. The wireless device of claim 12, wherein the information is any one or more of: an absolute value of $\sqrt{I^2+Q^2}$, $|I^2+Q^2|$, $\max(|I|, |Q|)$, and $$(|I|^{\alpha} + |Q|^{\alpha})^{\frac{1}{\alpha}},$$

wherein I and Q are signal components corresponding to a complex value of an element in the matrix, and $\alpha$ is a positive number.

14. The wireless device of claim 1, wherein the matrix is any of a channel matrix for at least one sub-band, a precoding matrix for at least one sub-band, a precoding matrix associated with at least one indicated spatial beam for at least one sub-band or a precoding matrix associated with at least one indicated spatial beam and at least one indicated delay.

15. The wireless device of claim 1, wherein the output is compressed information and/or predicted information corresponding to the matrix.

16. A cellular base station, comprising:

an antenna;

a radio coupled to the antenna; and a processor coupled to the radio;

wherein the processor is configured to:

receive, via the radio, information indicating channel state information (CSI) feedback from a wireless device;

input the information into a neural network; and obtain an output from the neural network, wherein the output is a matrix related to the CSI feedback, the matrix corresponds to a spatial layer at the wireless device, and the matrix comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors is associated with a same polarization of the antenna, and said plurality of vectors are associated with two different polarizations of the antenna, and wherein the matrix is arranged such that vectors in the first dimension associated with a same polarization are arranged next to each other.

17. A method for a wireless device, comprising:

generating a matrix related to channel state information (CSI) feedback, wherein the matrix corresponds to a spatial layer at the wireless device and comprises a plurality of vectors in a first dimension, a number of said plurality of vectors is the same as a size of a second dimension of the matrix, a number of elements in each of said plurality of vectors is the same as a size of the first dimension of the matrix, and said plurality of vectors belong to at least two groups, each group of vectors is associated with a same polarization of an antenna of a cellular base station, and said plurality of vectors are associated with two different polarizations of the antenna of the cellular base station, wherein the matrix is arranged by arranging said plurality of vectors in the first dimension according to the polarizations such that vectors associated with a same polarization are arranged next to each other;

obtaining an output from processing the matrix using a neural network (NN); and transmitting, via a radio, information indicating the output to the cellular base station.

18. The method of claim 17, wherein the NN is a real-value neural network.

19. The method of claim 17 wherein the NN is a complex-value neural network.

20. The method of claim 18, wherein the method further comprises:

arranging the matrix by splitting the matrix into a first submatrix comprising elements each corresponding to a real part value of each element of the matrix, and a second submatrix comprising elements each corresponding to an imaginary part value of each element of the matrix, wherein the first submatrix and the second submatrix are arranged according to said two different polarizations such that vectors in the first dimension in the first submatrix associated with a same polarization are arranged next to each other and vectors in the first dimension in the second submatrix associated with a same polarization are arranged next to each other, and inputting the first submatrix and the second submatrix as two input channels into the NN.

* * * * *